United States Patent
Kawada et al.

[11] Patent Number: 5,920,174
[45] Date of Patent: Jul. 6, 1999

[54] CONTROL APPARATUS OF ELECTRIC POWER STEERING APPARATUS

[75] Inventors: Hideaki Kawada; Hiroyuki Kanoh; Hisayoshi Koiwai; Syuji Endo; Yoshinori Sugiyama; Yuji Kouzaki, all of Gunma-ken, Japan

[73] Assignee: NSK Ltd., Tokyo, Japan

[21] Appl. No.: 08/656,329

[22] PCT Filed: Oct. 13, 1995

[86] PCT No.: PCT/JP95/02098

§ 371 Date: Jun. 14, 1996

§ 102(e) Date: Jun. 14, 1996

[87] PCT Pub. No.: WO96/11831

PCT Pub. Date: Apr. 25, 1996

[30] Foreign Application Priority Data

Oct. 14, 1994 [JP] Japan .................................... 6-274268
Jan. 25, 1995 [JP] Japan .................................... 7-027761

[51] Int. Cl.[6] ...................................................... B62D 5/04
[52] U.S. Cl. ............................ 318/663; 318/432; 318/489
[58] Field of Search ................................... 318/646, 652, 318/663, 670, 432, 433, 474, 489; 180/443; 364/424.051

[56] References Cited

U.S. PATENT DOCUMENTS 5,097,420  3/1992  Morishita ......................... 180/79.1 X
5,699,874  12/1997 Miyaura ................................. 180/443

FOREIGN PATENT DOCUMENTS 63-82875   4/1988  Japan .
3-121974   5/1991  Japan .
6-9973     2/1994  Japan .
6-20121    5/1994  Japan .

Primary Examiner—Bentsu Ro
Attorney, Agent, or Firm—Sughrue, Mion, Zinn, Macpeak & Seas, PLLC

[57] ABSTRACT

A control apparatus of an electric power steering apparatus capable of firmly detecting an abnormality of a torque detection value, caused by a drift occurred in a torque sensor and by a connector contact resistor, with a simple arrangement. A current supplied from a power supply flows through a potentiometer (3A) of a torque sensor (3), this current is supplied to a current detecting resistor (13g), a drift occurred in the torque sensor (3) is detected by a voltage across terminals of this resistor, the detected drift detection voltage $V_{is}$ is read in a microcomputer (21), and the drift detection voltage $V_{is}$ is compared with a set value to judge as to whether or not the drift is present within a normal range. The torque sensor is constructed of a main potentiometer ($3_M$) and a sub-potentiometer ($3_S$). A change amount $\Delta V_M$ is calculated from a difference between a presently detected value and a previously detected value of the torque detection voltage $V_{2M}$ of the main potentiometer. Also, a change amount $\Delta V_S$ as to the sub-potentiometer is similarly calculated. An abnormality of the torque detection value is judged in response to these change amounts $\Delta V_M$ and $\Delta V_S$.

7 Claims, 17 Drawing Sheets

CONTROL APPARATUS OF ELECTRIC POWER STEERING APPARATUS

RELATED APPLICATION

This application is a National Stage of International Application No. PCT/JP95/02098 under 35 U.S.C. §371, filed Oct. 13, 1995.

TECHNICAL FIELD

The present invention relates to a control apparatus of an electric power steering apparatus equipped with an apparatus capable of detecting abnormality of a torque detection value.

BACKGROUND ART

In general, in a control apparatus of an electric power steering apparatus, a detection is made by a torque sensor constructed by a steering torque potentiometer of a steering system, and an electric motor for producing steering auxiliary force to the above-described steering system is controlled by a control means in response to a torque detection value of the torque sensor.

As described above, in the control apparatus of the electric power steering apparatus, since the steering auxiliary force produced by the electric motor is controlled based on the torque detection value of the torque sensor, when the torque detection value detected by the torque sensor is brought into the abnormality condition, the correct control can be no longer performed. Therefore, it is required to detect the abnormality of the torque sensor.

Here, as the abnormality of the torque sensor, there are two types of abnormality. That is, the torque detection value is drifted due to variations in power supply voltages and the aging change in contact resistance values of a connector connected to the torque sensor. Also, the torque detection value becomes abnormal, because of abnormality in the torque sensor caused by variations in the torque detection value by the aging change in the contact resistance values of the connector, and also loose contacts of the sliding contactor of the potentiometer.

Conventionally, as the drift detecting circuit for detecting drift abnormality of the torque sensor, for instance, one drift detecting circuit as shown in FIG. 20 has been proposed.

In this prior art, a torque sensor 101 is so arranged that applied steering torque is converted into torsion angle displacement of a torsion bar, and this torsion angle displacement is detected by a main potentiometer 102 and a sub-potentiometer 103 series-connected to the main potentiometer 102. Both end portions of the series circuit constructed of the series-connected potentiometers 102 and 103 are commonly connected to a power supply E, and the connection portion of the serial circuit is grounded. Torque voltages are derived from sliding contactors 102a and 103a of the respective potentiometers 102 and 103 by supplying the current of the power supply thereto, and these torque voltages are inputted to an electronic control circuit 104 employed in a power steering apparatus. Then, each of torque voltages Vm and Vs appearing at each of input resistors Rm and Rs provided at the input terminal of this electric control circuit 104 is entered via A/D converters 105 and 106 to a microcomputer 107. In the microcomputer 107, a calculation is made of a motor current instruction value based upon the torque voltage value Vm of the main potentiometer 102, and a drift is detected based upon the torque voltage values Vm and Vs of both of the main potentiometer 102 and the sub-potentiometer 103.

As indicated by a solid line in FIG. 21, torque voltages representative of a mutual reverse phase characteristic (cross characteristic) are produced from the respective potentiometers 102 and 103 constructed in the above manner. The torque voltage Vm of the sliding contactor 102a and the torque voltage Vs of the sliding contactor 103a become the same value as the voltage value Vo when the input torque is zero. For instance, assuming now that the respective sliding contactors 102a and 103a are moved together toward the lower side in the circuit diagram of FIG. 20 by applying right steering torque thereto, the torque voltage Vm is decreased in a substantially linear form, whereas the torque voltage Vs is increased in a substantially linear form. On the other hand, assuming now that the respective sliding contactors 102a and 103a are moved together toward the upper side by applying left steering torque thereto, the torque voltage Vm is increased in a substantially linear form, whereas the torque voltage Vs is decreased in a substantially linear form. Then, the torque voltages Vm and Vs represent the same voltage values when the absolute values of the applied torque are equal to each other.

In the torque sensor having such an output characteristic, a drift in torque sensor outputs caused by the variations in the power supply voltage, and also the aging changes in the contact resistance values of the connector connected to this torque sensor is detected as follows:

For example, assuming now that the power supply voltage E applied to the torque sensor 101 is decreased due to the temperature changes, drifts appearing in the respective torque voltages Vm and Vs have small amounts when the output voltage is low, whereas drifts own large mounts when the output voltage is high, as indicated by a broken line of FIG. 21, namely these drifts are not constant. Therefore, first of all, a voltage Vo appearing at a neutral point, corresponding to an average value of the torque voltage Vm and the torque voltage Vs when there is no drift, is previously precalculated based on the following formula:

$$Vo = \tfrac{1}{2}(Vm + Vs) \qquad (1).$$

Then, with employment of the torque voltage Vmd of the main potentiometer containing the drift and the torque voltage Vsd of the sub-potentiometer containing the drift, a drift value $\Delta Vd$ is calculated as an average value of deviation with respect to the voltage Vo appearing at the neutral point based on the following formula:

$$\Delta Vd = \tfrac{1}{2}(Vmd + Vsd) - Vo \qquad (2).$$

Next, an absolute value of this drift value $\Delta Vd$ is calculated. This calculated absolute value is compared with a preset value. Then, an occurrence of this drift is detected by judging whether or not the calculated value is larger than the preset value.

However, in the above-described conventional drift detection circuit, the drift is detected based upon a difference between the torque voltages of the two systems constructed of the main potentiometer and the sub-potentiometer. The drift value "Vd" is given from the above-described formulae (1) and (2) as follows:

$$\Delta Vd = \tfrac{1}{2}(Vmd - Vm) + \tfrac{1}{2}(Vsd - Vs) \qquad (3).$$

As a consequence, the drift value $\Delta Vd$ is defined by adding a half of the deviation component of the main potentiometer to a half of the deviation amount of the sub-potentiometer. For example, since the deviation amount of the sub-potentiometer becomes substantially zero at the left end of the characteristic diagram shown in FIG. 21, the drift value ΔVd to be calculated becomes only the ½ deviation amount of the main potentiometer.

As described above, since the drift calculated in the above-described prior art is detected as such a value smaller than the actual variation value of the power supply voltage, the drift detection sensitivity would be lowered. There is a problem that the drift could not be detected until the difference in the output signal voltages of the two signal paths becomes a certain large value. As a consequence, there is a risk that the drive current containing the drifts will flow through the electric motor until the drifts are detected, and thus the steering wheel would be self-steered. This may impede safety drive.

On the other hand, the torque-detection-value-abnormality detecting apparatus for detecting the abnormality of the torque detected value from the torque sensor is described in, for instance, Japanese Patent publication No. Hei. 6-9973. In this prior art, when the difference between the torque detected values outputted from the first displacement-to-electric signal converting unit and the second displacement-to-electric signal converting unit employed in the torque sensor is larger than or equal to a predetermined value, a judgement is made that the torque sensor is abnormal. At this time, the operations of the electric motor and the electromagnetic clutch of the electric power steering apparatus are stopped so as to maintain the vehicle under safe state.

However, in the above-explained conventional torque-detection-value-abnormality detecting apparatus, the difference value between the main torque detection value and the sub-torque detection value is compared with a preset value to judge the abnormality. When this predetermined value ΔT is preset, in order to correctly judge the abnormality, it is desirable to preset the value by considering tolerance in the connector contact resistance values predictable during the manufacturing/assembling operations. Thus, for example, as shown in FIG. 22, in the case that there is the tolerance $T_{OFF}$ in the second displacement-to-electric signal converting unit on the sub-signal path side, since a larger preset value ΔT is set by taking this tolerance $T_{OFF}$ into consideration and also by giving a clearance so as to stably judge the normal/abnormal conditions, there is a problem that precision in detecting the abnormality would be lowered.

Also, in the prior art described in the above-mentioned publication, as indicated in FIG. 23 for instance, when the connector contact resistance value of the signal line in the first displacement-to-electric signal converting unit on the main signal path side is increased to thereby vary the torque voltage value, the variation range (i.e., difference in torque detection values) near the neutral position where the applied steering torque is low would appear as a small value, as compared with the variation range where, for instance, the right steering torque is high. As described above, there are differences in the variation ranges every time the steering torque is applied. Thus, there is another problem. That is, it is difficult to keep the detection precision constant.

DISCLOSURE OF THE INVENTION

The present invention is intended to solve the above-described problems, and has an object to provide a control apparatus of an electric power steering apparats with a simple structure, capable of firmly detecting a drift contained in a torque sensor output, and also capable of avoiding a self-steer of a steering wheel.

Further, the present invention has another object to provide a control apparatus of an electric power steering apparatus capable of improving detection precision of abnormality in a torque detection value, and also capable of stabilizing the torque detection precision.

To achieve this object, a control apparatus of an electric power steering apparatus, is characterized as including a torque sensor for detecting steering torque of a steering system and equipped with a torque detecting potentiometer having a resistance body, both ends of which being connected to a power supply, and a sliding contactor slid on the resistance body for outputting a torque detection value; an electric motor for producing a steering auxiliary force to the steering system; control means for outputting a control signal used to control the electric motor in response to at least the torque detection value outputted from the torque sensor; and drive means for driving the electric motor in response to the control signal of the control means, the control apparatus comprises current detecting means for detecting a power supply current flowing between both ends of the potentiometer; and drift detecting means for comparing the output value of the current detecting means with a preset value to thereby detect a drift occurred in the potentiometer.

According to one embodiment the invention, the current supplied from the power supply flows through the torque detecting potentiometer, this current is detected by the current detecting means, and the detected value is compared with a preset value by the drift detecting means to detect the drift occurred in the potentiometer. The drifts caused by the variation of the power supply and the changes in the connection resistor of the connector, is detected as a change in the currents. The current detecting means is constructed of, for example, a fixed resistor. When the current is entered via the potentiometer to this fixed resistor, the drift appears as a change in the terminal voltage of this fixed resistor. This terminal voltage value is compared with the preset value by the drift detecting means, so that the drift occurred in the potentiometer can be firmly detected.

A control apparatus of an electric power steering apparatus, according to one aspect of this embodiment of the invention, is characterized in that a torque detection value setting means for setting the torque detection value supplied when no steering torque is applied to the same value as the voltage value outputted from the potentiometer to thereby output the set torque detection value to the control means, is arranged between the same power supply and ground as those of the potentiometer.

In accordance with this aspect of the invention when no steering torque is applied, the torque detection value supplied from the torque detecting potentiometer to the torque detection value setting means is set to be equal to the voltage value outputted from the potentiometer, and then the resultant value is outputted to the control means, for example, even when the drifts caused by the increase in the connector contact resistance value of the torque signal input/output terminal happens to occur.

Furthermore, a control apparatus of an electric power steering apparatus, according to an additional aspect of the invention, is characterized in that the torque sensor is constructed by a current input terminal and a drift output terminal connected to both ends of the power supply; a potentiometer connected between both of the current input terminal and the drift output terminal; and a torque signal output terminal connected to the sliding contactor of the potentiometer, and that the torque detection value setting means is constructed of torque detection value setting resistors each connected between the torque signal output terminal and both ends of the power supply.

According to the invention as defined in claim 3, even when the drift caused by the increases in the connector contact resistor at the torque signal output terminal and the like happens to occur, the torque detection value when no steering torque is applied is set to be equal to the voltage value outputted to the potentiometer by way of the torque detection value setting resistor, which will then be outputted to the control means.

Also, a control apparatus of an electric power steering apparatus, according to yet another aspect of the present invention, is characterized in that, in a control apparatus of an electric power steering apparatus including a torque sensor for detecting steering torque of a steering system and equipped with a torque detecting potentiometer having a resistance body, both ends of which being connected to a power supply, and a sliding contactor slid on the resistance body for outputting a torque detection value; an electric motor for producing a steering auxiliary force to the steering system; control means for controling the steering auxiliary force generated by the electric motor in response to at least the torque detection value outputted from the torque sensor: the torque sensor is constructed of a main potentiometer and a sub-potentiometer; the control means controls the steering auxiliary force generated by the electric motor based upon at least torque detection value of the main potentiometer; and the control apparatus further comprises abnormality detecting means for calculating a change amount per unit hour at the same time as to each of torque detection values of the main potentiometer and of the sub-potentiometer, and also for calculating a difference value between the calculated change amount of the main potentiometer and the calculated change amount of the sub-potentiometer to thereby detect abnormality of the torque detection value based on the difference value.

In accordance with this aspect the invention, a calculation is made of the difference value at the same time between the change amount of the torque detection value per unit hour, outputted from the main torque sensor, and the change amount of the torque detection value per unit hour, outputted from the sub-potentiometer. From this difference value, the abnormality of the torque detection value is detected. For instance, the abnormalitys of the torque detection value are detected, which are, for example, the malfunction of the torque sensor caused by variations in the torque detection values due to the aging effects of the connector contact resistance values, and also by the loose contacts of the sliding contactors of the potentiometers. Moreover, as to this abnormality detection of the torque detection value, the abnormality is not merely detected from the absolute difference value of the torque detection values of the main torque sensor and the sub-torque sensor. But, the abnormality is detected based upon the relative difference between the change amount of the torque detection value per unit hour, outputted from the main torque sensor, and the change amount of the torque detection value per unit hour, outputted from the sub-torque sensor. Accordingly, it is possible to obtain the stable difference value of the torque detection values irrelevant to the magnitudes of the applied steering torque. As a consequence, even when a very small steering force is applied, i.e., a very small torque detection value, the abnormality of the torque detection value can be detected in a similar manner when a large steering force is applied.

A control apparatus of an electric power steering apparatus, according to this aspect of the invention, is further characterized in that the torque sensor is constructed by connection terminals connected to both ends of the power supply; the main potentiometer/sub-potentiometer connected in parallel between the connection terminals; and a torque detection value output terminal connected to sliding contactors of both of the main and sub-potentiometers.

According to this further characterized aspect of the invention, the external connection terminal of the torque sensor can be constructed of three components, i.e., one pair of connection terminals and the torque signal output terminal. The structure of the external connection terminal can be made simple, and can be easily connected to the control means.

A control apparatus of an electric power steering apparatus, according to the invention, may also be characterized in that the torque sensor is constructed by two sets of connection terminals connected in parallel between both ends of the power supply; a main potentiometer connected to one set of connection terminals; a sub-potentiometer connected to the other set of connection terminals; and torque detection value output terminals connected to sliding contactors of both of the main and sub-potentiometers.

In accordance with this characterization of the invention, it is also possible to detect the increase in the contact resistance value occurred in the power supply line. The changes in all of the contact resistance values existing in the torque sensor and the control means can be detected, and the abnormality of the torque detection values caused by this can be detected.

Furthermore, a control apparatus of an electric power steering apparatus, according to yet another aspect of the present invention, is characterized in that, in a control apparatus of an electric power steering apparatus including a torque sensor for detecting steering torque of a steering system and equipped with a torque detecting potentiometer having a resistance body, both ends of which being connected to a power supply, and a sliding contactor slid on the resistance body for outputting a torque detection value; an electric motor for producing a steering auxiliary force to the steering system; control means for outputting a control signal used to control the electric motor in response to at least the torque detection value outputted from the torque sensor; and drive means for driving the electric motor in response to the control signal of the control means: the torque sensor is constructed of a main potentiometer and a sub-potentiometer; the control means controls the steering auxiliary force generated by the electric motor based upon at least torque detection value of the main potentiometer; and the control apparatus further comprises abnormality detecting means for calculating a change amount per unit hour at the same time as to each of torque detection values of the main potentiometer and of the sub-potentiometer, and also for calculating a difference value between the calculated change amount of the main potentiometer and the calculated change amount of the sub-potentiometer to thereby detect abnormality of the torque detection value based on the difference value; current detecting means for detecting a power supply current flowing between both the ends of the potentiometer; and drift detecting means for comparing the output value of the current detecting means with a preset value to thereby detect a drift occurred in the potentiometer.

According to this aspect of the invention, the drifts produced in the potentiometers can be firmly detected. Also, for example, the abnormality of the torque detection values such as the malfunction of the torque sensor can be correctly detected, which are caused by the variation in the torque detection value due to the aging effect of the connector contact resistance value, and by the loose contacts of the sliding contactors of the potentiometers irrelevant to such a very small steering force under which the torque detection value is low, and such a large steering force.

BEST MODE TO PRACTICE THE INVENTION

Referring now to drawings, an embodiment of the present invention will be explained.

Figure 1:
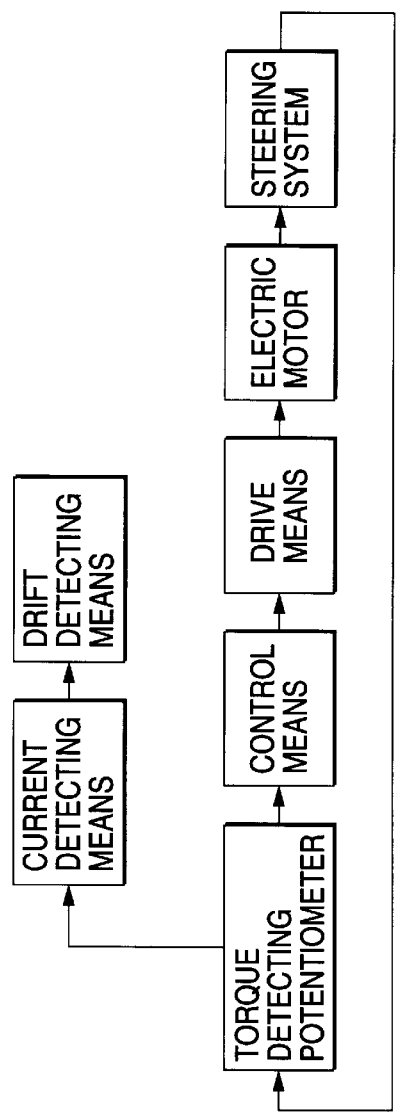
FIG. 1 is a claim corresponding block diagram according to claim 1 of the present invention.
Figure 2:
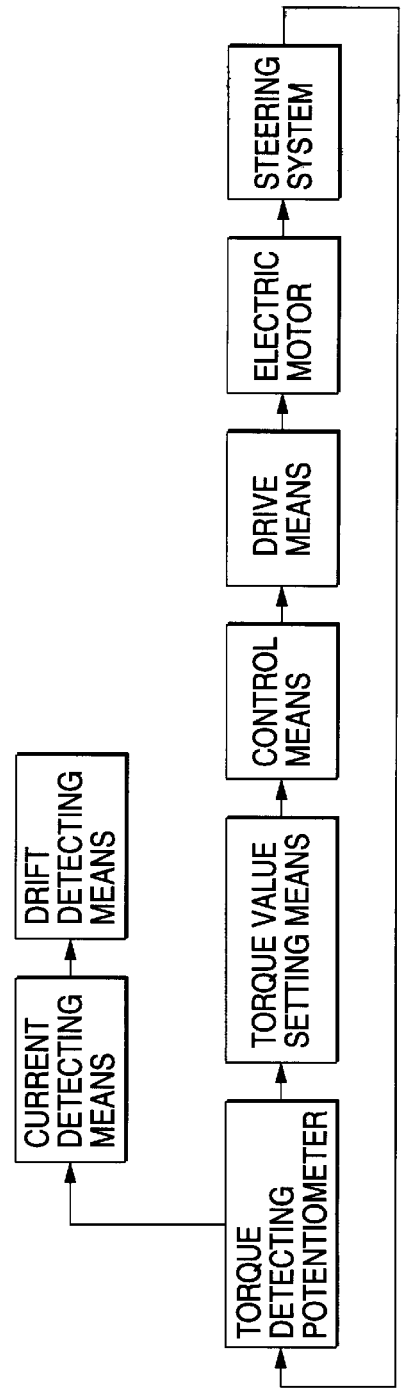
FIG. 2 is a claim corresponding block diagram according to claim 2 of the present invention.
Figure 3:
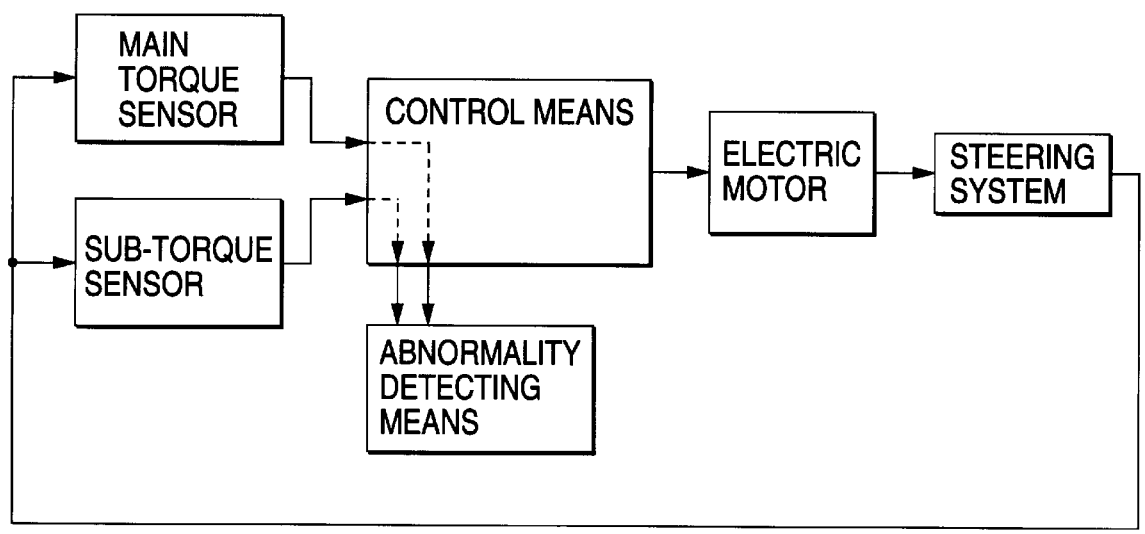
FIG. 3 is a claim corresponding block diagram according to claim 3 of the present invention.
Figure 4:
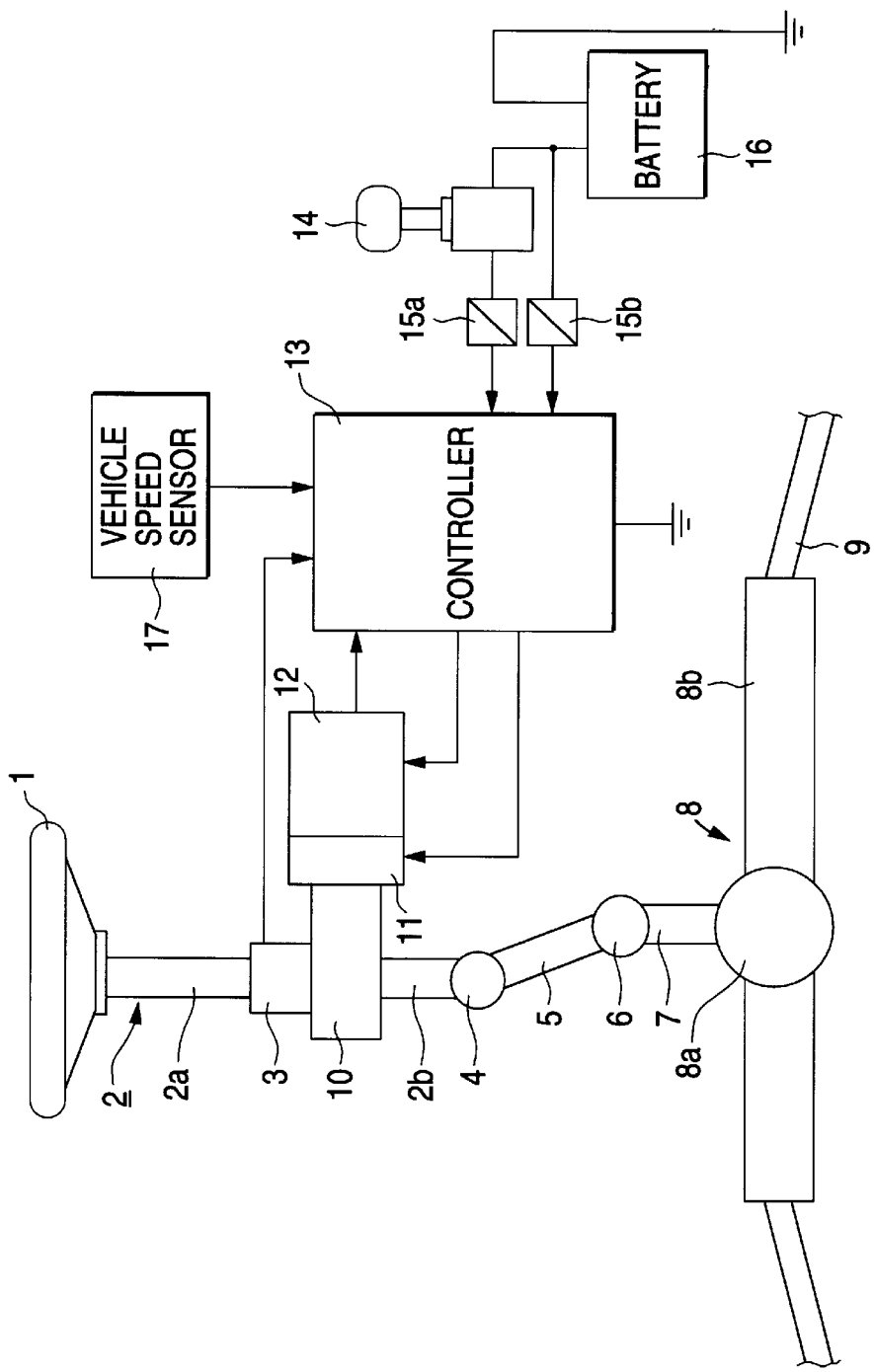
FIG. 4 is a schematic structural diagram for showing one example of an electric power steering apparatus according to the present invention.

FIG. 4 is a schematic structural diagram of an electric power steering apparatus according to the present invention. In this drawing, reference numeral 1 is a steering wheel. The steering force effected to this steering wheel is transferred to a steering shaft 2 constructed of an input shaft 2a and an output shaft 2b. One end of this input shaft 2a is coupled to the steering wheel 1, and the other end thereof is coupled to one end of the output shaft 2b via a torque sensor 3 functioning as a torque detecting means.

Then, the steering force transferred to the output shaft 2b is transferred via a universal joint 4 to a lower shaft 5, and is further transferred via a universal joint 6 to a pinion shaft 7. Furthermore, the steering force is transferred via a steering gear 8 to a tie rod 9 so as to steer a steering wheel. The steering gear 8 is arranged in a rack-and-pinion form containing a pinion 8a and a rack 8b. The rotary moment transferred to the pinion 8a is translated into the linear propagation moment by way of the rack 8b.

Reduction gears 10 for transferring auxiliary steering force (assist force) to the output shaft 2b is coupled to the output shaft 2b of the steering shaft 2, whereas an output shaft of an electric motor 12 for generating the auxiliary steering force is coupled to the reduction gears 10 via an electromagnetic clutch apparatus 11 constructed of, for example, an electromagnetic type clutch apparatus for transferring/interrupting the auxiliary steering force.

This electromagnetic clutch apparatus 11 includes a solenoid. The reduction gears 10 are mechanically coupled to the electric motor 12 by supplying an energizing current to this solenoid by a controller 13 (which will be discussed later), and are mechanically decoupled from the electric motor 12 by stopping the supply of the energizing current.

A torque sensor 3 senses steering torque which is applied to the steering wheel 1 and then transferred to the input shaft 2a. The torque sensor 3 is so arranged that, for example, the steering torque is translated into torsion angle displacement of a torsion bar interposed between the input shaft 2a and the output shaft 2b, this torsion angle displacement is translated into linear propagation moment by a ball screw member, and a lever coupled to a sliding contactor of a potentiometer is moved by the ball screw member, and then a resistance value outputted from the sliding contactor is variable. A torque detection value constructed of a voltage value outputted from the sliding contactor of this torque sensor 3 is supplied to a controller 13.

In response to the torque detection value T and the current detection value of the electric motor 12, the controller 13 controls the drive current supplied to the electric motor 12. A signal corresponding t the drive current of the electric motor 12 is fed back to this controller 13, and in response to this feed back signal, the current outputted from the controller 13 to the electric motor 12 is feed-back controlled. Furthermore, a current is supplied from a battery 16 through an ignition switch 14 and a fuse 15a. In addition, a vehicle speed detection signal $V_P$ from a vehicle speed sensor 17 for producing a pulse signal having a time period corresponding to, for example, an output speed of a gearbox (transmission) is entered into the controller 13 to thereby produce auxiliary steering force in response to the vehicle speed.

Figure 5:
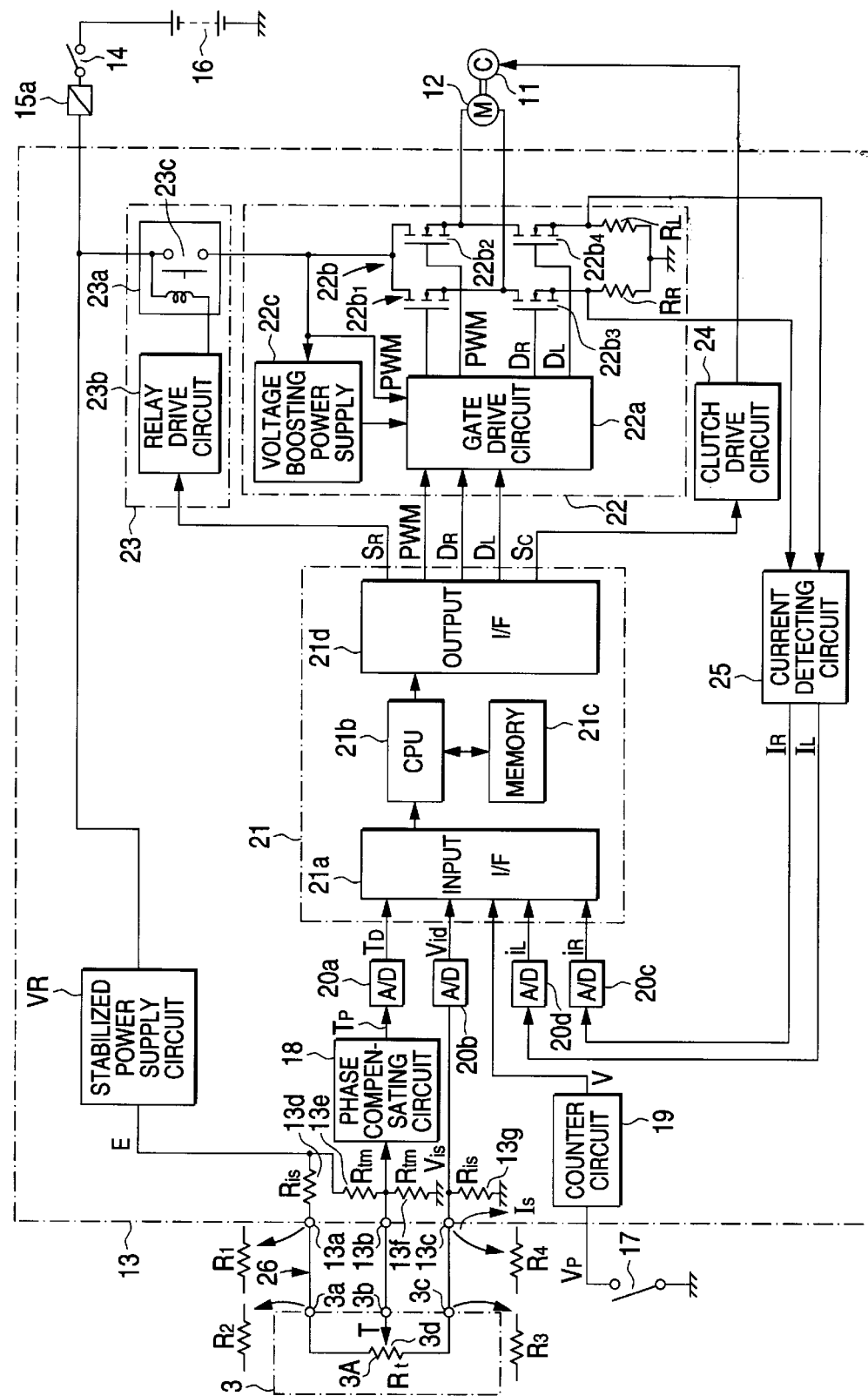
FIG. 5 is a block diagram for representing such a case that a drift abnormality of a torque detection value is detected according to a first embodiment of the present invention.

In FIG. 5, there is shown a basic arrangement of the torque sensor 3 and the controller 13, according to an embodiment of the present invention. As shown in this drawing, a potentiometer 3A of the torque sensor 3 is so constructed as to derive a variable resistance value from a sliding contactor 3d, and has a resistance value $R_P$ across the both ends thereof. Both of the end portions of the potentiometer 3A are connected to a current input terminal 3a and a drift output terminal 3c of the torque sensor 3, and a sliding contactor 3d for outputting the torque detection value T is connected to the torque signal output terminal 3b.

The respective terminals 3a to 3c of the torque sensor 3 are connected to a cable 26 having connectors at both ends thereof, and are connected via this cable 26 to a current output terminal 13a, a torque signal input terminal 13b, which are provided with the controller 13, respectively.

Here, it is assumed that a connector contact resistance value of the current output terminal 13a is "R1", the respective connector resistance values of the current input terminal 3a, drift output terminal 3c and drift input terminal 13c are "R2", "R3" and "R4", and connector contact resistance values of the torque signal output terminal 3b and the torque signal input terminal 13b are "R5" and "R6", which connected by the connectors.

A power voltage E is applied from a stabilizing power supply circuit VR via a current detection resistor 13d having a resistance value Ris to the current output terminal 13a. Then, the torque signal input terminal 13b is connected to a junction point between torque detection value setting resistors 13e and 13f series-connected to each other, functioning as a torque detection value setting means. This junction point is connected to a phase compensating circuit 18 (which will be explained later). Both of the torque detection value setting resistors 13e and 13f each own a resistance value Rtm. The current supplied from the stabilizing power supply circuit VR will flow through the torque detection value setting resistors 13e and 13f to the ground potential. Then, the drift input terminal 13c is grounded via a current detecting resistor 13g functioning as a current detecting means having the resistance value Ris. A power supply is supplied via the ignition switch 14 and the fuse 15a from the battery 16 to the stabilizing power supply circuit VR.

The torque detection value T inputted to the torque signal input terminal 13b is supplied to the phase compensating circuit 18 for compensating for the phase of the inputted signal to thereby increase stability of the electric power steering apparatus.

A drift detection voltage Vis appears across the current detection resistor 13g provided with the drift input terminal 13c, and this voltage is supplied to an A/D converter 20b.

In this case, an input impedance of the phase compensating circuit 18 is set so as to have a sufficiently large value, as compared with the resistance value Rt of the potentiometer 3A, the resistance value Rtm of the respective torque detection value setting resistors 13e and 13f, and also the resistance value R is of the current detection resistor 13g. As a consequence, the influence given by the input impedance of the phase compensating circuit 18 can be substantially neglected.

The controller 13 includes the torque detection value setting resistors 13e, 13f, the current detection resistor 13g, the phase compensating circuit 18, and a stabilized power supply circuit VR. Further, the controller 13 is constructed of a counter circuit 19 for accumulating the pulse number of the vehicle speed detecting signal Vp per unit hour, supplied from the vehicle speed sensor 17, to output the vehicle speed detection value V, and also whose count value is reset by a microcomputer 21 (will be described later) when the vehicle speed detection value V is read into the microcomputer 21. The controller 13 further includes A/D converters 20a to 20d which convert an output signal Tp of the phase compensating circuit 18, the drift detection voltage Vis, and motor current detection signals $I_R$, $I_L$ (will be discussed later) into a torque detection value $T_D$, a drift detection value Vid, and a motor current detection value $i_R$, $i_L$ in digital signal forms, respectively. The controller 13 is furthermore arranged by the microcomputer 21 to which the output signals from the counter circuit 19 and the A/D converters 20a to 20d are supplied; a motor drive circuit 22 functioning as a drive means for driving the electric motor 12 in response to the output signal from the microcomputer 21; a fail-safe relay circuit 23 functioning as a fail-safe means for supplying an entered power supply current to the motor drive circuit 22; a clutch drive circuit 24 for driving the electromagnetic clutch apparatus 11 in response to the output signal from the microcomputer 21; and also a current detecting circuit 25 for detecting a magnitude and a direction of the motor current and for feeding back motor current detection signals $I_R$, $I_L$ thereof to the microcomputer 21.

The microcomputer 21 includes an input interface 21a into which the output signals from the counter circuit 19 and the A/D converters 20a to 20d; a central processing unit (CPU) 21b for executing a drift detecting process functioning as a drift detecting means, and a drive control process of the electric motor 12 in response to the torque detection value T; a memory 21c for storing therein a set value used to compare/detect the drifts, a process sequence for performing a control after the drift detection, and a process sequence for controlling the drive of the electric motor 12; and also an output interface 21d.

From this output interface 21d, a pulse width modulation signal PWM, a right direction signal $D_R$, and a left direction signal $D_L$ are outputted. The pulse width of this pulse width modulation signal PWM is changed in response to a voltage value of a motor drive signal $S_M$ (will be discussed later) outputted from the central processing unit 21b. The right direction signal $D_R$ and the left direction signal $D_L$ define the rotation directions of the electric motor 12. These signals are supplied to the motor drive circuit 22. Further, a relay control signal $S_R$ and a clutch control signal, $S_C$ are outputted from the output interface 21d, and are furnished to the fail-safe relay circuit 23 and the clutch drive circuit 24.

The motor drive circuit 22 owns a gate drive circuit 22a, an H bridge circuit 22b, and a voltage boosting (step-up) power supply 22c.

The gate drive circuit 22a outputs the supplied right/left direction signals $D_R$, $D_L$ to the H bridge circuit 22b, and also shapes the waveform of the supplied pulse width modulation signal PWM in order to improve the response characteristic of the electric motor 12. The waveform-shaped pulse width modulation signal PWM is outputted to the H bridge circuit 22b. In response to the supplied right/left direction signals $D_R$, $D_L$, the gate drive circuit 22a switches the pulse width modulation signal PWM to be outputted. For instance, when the right direction signal $D_R$ is supplied, the pulse width modulation signal PWM is outputted only to an FET (field-effect transistor) 22b2 (will be explained later) of the H-bridge circuit 22b. When the left direction signal $D_L$ is supplied, the pulse width modulation signal PWM is outputted only to an FET 22b1 (will be described later).

The H bridge circuit 22b supplies the drive current to the electric motor 12 based upon the output signal of the gate drive circuit 22a, and includes four switching transistors, for example, N-channel power MOS type FETs 22b1 to 22b4. A series circuit to connect the source terminal of the FET 22b1 with the drain terminal of the FET 22b3 is provided in parallel to a series circuit to connect the source terminal of the FET 22b2 with the drain terminal of the FET 22b4, and the electric motor 12 is interposed between the connected portions of the FETs in the respective series circuit. The pulse width modulation signal PWM is supplied from the gate drive circuit 22a to the gate terminals of the respective FETs 22b1 and 22b2 at the upper stage in response to the right/left direction signals $D_R$, $D_L$, whereas the right direction signal $D_R$ and the left direction signal $D_L$ are supplied from the gate drive circuit 22a to the gate terminals of the respective FETs 22b3 and 22b4 at the lower stage. The battery 16 is connected via the fail safe relay circuit 23, the fuse 15a, and the ignition switch 14 to the respective drain terminals of the FET 22b1 and the FET 22b2. The respective source terminals of the FET 22b3 and the FET 22b4 are grounded via the respective current detection resistors $R_R$ and $R_L$.

In this case, when the right direction signal $D_R$ and the left direction signal $D_L$ are at high levels, the FET 22b3 and the FET 22b4 are brought into ON states. When the FET 22b3 is under ON state, the pulse width modulation signal PWM is supplied to the FET 22b2, so that the motor drive current flows from the FET 22b2 to the direction of the electric motor 12 and the FET 22b3. On the other hand, when the FET 22b4 is under ON state, since the pulse width modulation signal PWM to supplied to the FET 22b1, the motor drive current flows from the FET 22b1 to the direction of the electric motor 12 and the FET 22b4.

The voltage boosting power supply 22c is constructed in such a manner that for instance, a battery voltage required to drive the FETs 22b1 and 22b2 within the H bridge circuit 22b is boosted twice an the boosted battery voltage is applied to the gate drive circuit 22a. It should be noted that the battery voltage is applied via the fail safe relay circuit 23a to the gate drive circuit 22a so as to drive the FETs 22b3 and 22b4.

The fail safe relay circuit 23 is arranged by a fail safe relay 23a having a relay constance 23c, and a relay drive circuit 23b for supplying an energizing current to a drive coil of the fail safe relay 23a. The relay drive circuit 23b is controlled in response to the supplied relay control signal $S_R$. One end of the relay contact 23c is connected via the fuse 15a and the ignition switch 14 to the battery 16. The other end of this relay contact 23c is connected to the respective drain terminals of the FETs 22b1 and 22b2 of the H bridge circuit 22.

In this first embodiment, when the relay control signal $S_R$ is at the high level, the relay drive circuit 23b is brought into the ON state, so that the energizing circuit is supplied to the drive coil of the fail safe relay 23a to thereby close the relay contact 23c. On the other hand, when the relay control signal $S_R$ is at the low level, the relay drive circuit 23b is brought into the OFF state to thereby open the relay contact 23c. In general, the relay contact 23c is closed while the electric power steering apparatus is operated, and the relay contact 23c is opened when the abnormality happens to occur in the motor drive circuit 22 and the like so as to keep safety.

The clutch drive circuit 24 amplifies the supplied clutch control signal $S_C$ to output such a signal for controlling the drive operation of the electromagnetic clutch apparatus 11. In this embodiment, when the clutch control signal $S_C$ is at the high level, the electromagnetic clutch apparatus 11 is brought into the connect state, whereas when the clutch control signal $S_C$ is at the low level, the electromagnetic clutch apparatus 11 is brought into the non-contact state.

The current detecting circuit 25 amplifies inputted voltages appearing at the respective terminals of the current detection resistors $R_R$ and $R_L$ so as to detect the respective motor drive currents, so that noise is removed. Thus, the detected motor current detection signal $I_R$ in the right direction and the detected motor current detection signal $I_L$ in the left direction are fed back to the input interface 21a via the respective A/D converters 20c and 20d. As a result, in accordance with the actually measured values of the motor currents, the pulse width of the pulse width modulation signal PWM is corrected, and the operation of the electric power steering apparatus during the occurrence of abnormality is stopped by the microcomputer 21.

In the torque sensor 3 and the controller 13 with the above-described circuit arrangement, a current $I_S$ will flow through the current detection resistor 13d, the potentiometer 3A, and the current detection resistor 13g by the stabilized power supply circuit VR having the output voltage E. This current value $I_S$ may be expressed by considering the connector contact resistance values R1 to R4 as follows:

$$I_S = E/[R_t + 2R_{is} + (R1+R2+R3+R4)] \quad (4)$$

The current values $I_S$ is changed in response to variations of the power supply voltage E and variations of the connector contact resistance values R1 to R4. Assuming now that the power supply voltage E is varied and then becomes $E \pm \Delta E$, the current value $I_S$ is given as follows:

$$I_S = (E \pm \Delta E)/[Rt + 2R_{is} + (R1+R2+R3+R4)] \quad (5)$$

As a result, the drift detection voltage $V_{is}$ at the terminal of the current detection resistor 13g is given as follows:

$$V_{is} = R_{is}(E \pm \Delta E)/[Rt + 2R_{is} + (R1+R2+R3+R4)] \quad (6)$$

Figure 6:
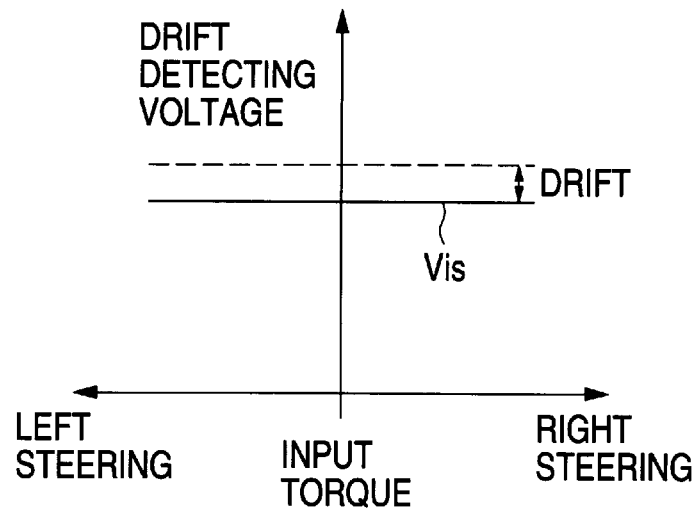
FIG. 6 is a characteristic diagram for indicating a drift characteristic according to the first embodiment.

As described above, the drift detection voltage $V_{is}$ is varied in response to the variation of the power supply voltage E. Consequently, the drifts occurred in the torque sensor 3, which are caused by the variations of the power supply voltage E and the variations of the connector contact resistance values R1 to R4 can be detected by detecting the current flowing through the potentiometer 3A by way of the current detection resistor 13g. The drift detection voltage $V_{is}$ is not changed by the input torque, as shown in FIG. 6, and then when the drift is produced, this drift detection voltage $V_{is}$ is uniformly increased/decreased in proportion to the drift amount, as indicated by a broken line.

The torque detection value T detected by the potentiometer 3A is derived as a torque voltage $V_t$ by way of the torque detection value setting resistors 13e and 13f of the controller 13. A torque voltage $V_{to}$ when the sliding contactor 3d is located at the neutral position may be expressed as follows:

$$V_{to} = E[R_t/2 + R_{is} + (R3+R4)]/[R_t + 2R_{is} + (R1+R2+R3+R4)] \quad (7)$$

Figure 7:
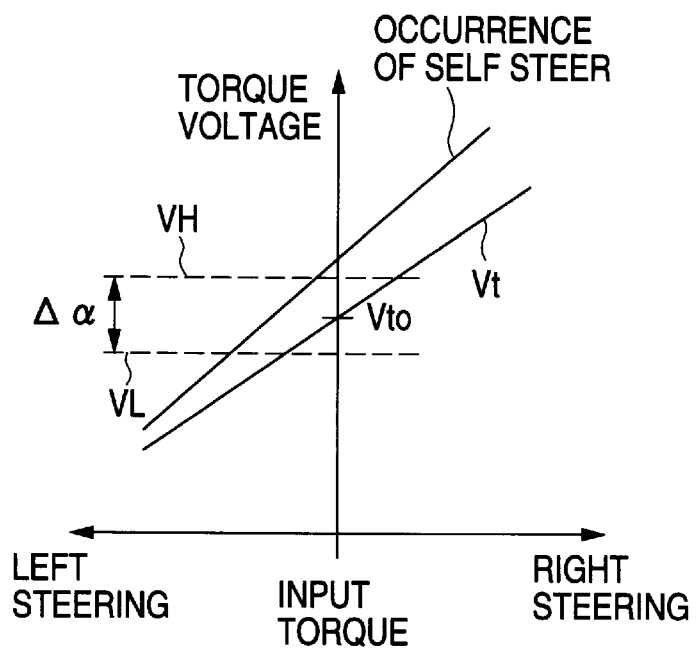
FIG. 7 is a characteristic diagram for showing a torque detection voltage according to the first embodiment.

As indicated in FIG. 7, the torque voltage $V_t$ is changed in a linear form with respect to the input torque. When the input torque becomes zero, it becomes a voltage $V_{to}$. When the left steering torque is increased, the voltage value of the torque voltage $V_t$ is increased, whereas when the left steering torque is increased, the voltage value thereof is decreased.

As indicated by a broken line, there is an insensitive band "$\Delta \alpha$" near the voltage value $V_{to}$ as a torque value width where even when the steering torque is applied, the electric motor is not driven. A self steer of a steering wheel happens to occur in such a case that, for instance, the neutral position voltage when the input torque becomes zero is changed due to the drift, and exceeds either an upper limit voltage value VH of the insensitive band $\Delta \alpha$, or a lower limit voltage value VL thereof, and then the torque voltage reaches a predetermined voltage value.

In this first embodiment, when the sliding contactor 3d is located at the neutral position, since the torque value setting resistors 13e and 13f having the same resistance values Rtm are employed, the torque voltage $V_t$ inputted to the phase compensating circuit 18 is maintained at the same voltage value as the neutral position voltage of the sliding contactor 3d. As a consequence, even when such a drift happens to occur, by which the resistances of the respective connector contact resistors R5 and R6 of the torque signal output terminal 3b and the torque signal input terminal 13b are increased, when the sliding contactor 3d is located at the neutral position, the torque voltage $V_t$ is maintained at a constant value, so that the self steer of the steering wheel can be avoided.

Figure 8:
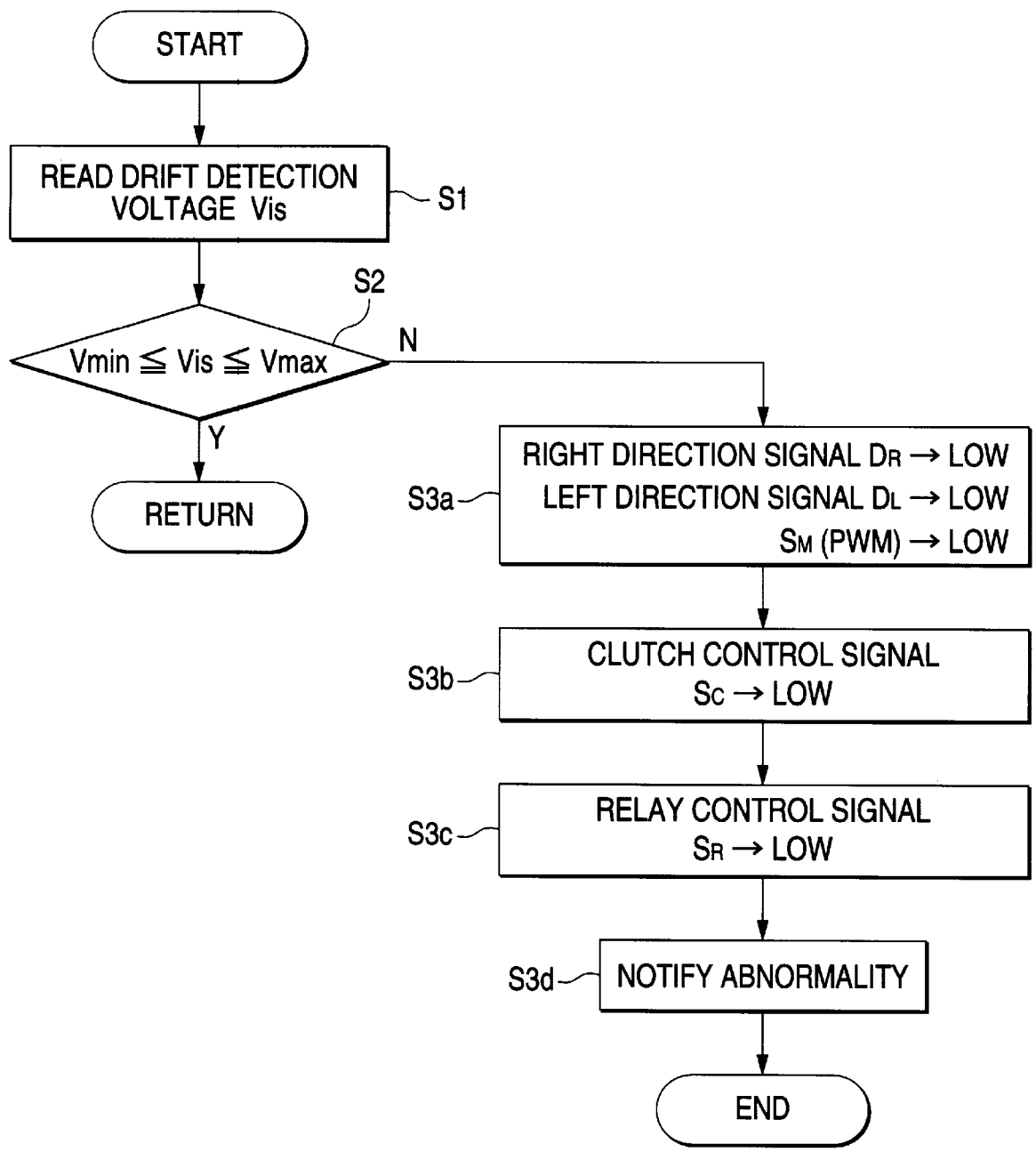
FIG. 8 is a flow chart for indicating a process sequence to detect the drift according to the first embodiment.

Next, a process sequence to detect a drift, executed in the central processing unit 21b, according to this embodiment will now be explained with reference to a flow chart of FIG. 8.

This process operation is carried out by executing, for instance, a timer interrupt to a predetermined main program every preselected time, e.g., executed every several msec.

First, at a step S1, the drift detection voltage $V_{is}$ is read via the A/D converter 20b. Next, at a step S2, a comparison is made between the drift detection voltage $V_{is}$, and a minimum value Vmin and a maximum value Vmax, which are used to detect the drift and have been previously set into the memory 21c.

It should be noted that the minimum value Vmin is set to such a value that no self steer happens to occur even when the power supply voltage E is lowered, and the connector contact resistance values R1 to R4 are increased. For example, this minimum value Vmin is set to a value slightly lower than the drift detection voltage $V_{is}$ corresponding to the lower limit voltage value VL of the insensitive band $\Delta\alpha$. Also, the maximum value Vmax is set to such a value that no self steer happen to occur even when the power supply voltage E is increased. This maximum value Vmax is set to, for example, a value slightly higher than the drift detection voltage $V_{is}$ corresponding to the upper limit voltage VH of the insensitive band $\Delta\alpha$. Then, when the drift detection voltage $V_{is}$ is higher than or equal to the minimum value Vmin, and also is lower than or equal to the maximum value Vmax, it is judged that the drift is present within the normal range. Accordingly, the drift detection is completed, and the process operation is returned to the main program in which the normal motor drive control process shown in FIG. 8 is executed to control the generation of the auxiliary steering force. These process operations defined at the steps S1 and S2 correspond to the drift detecting means.

In the case that as a judgement result of the step S2, either $0 \leq V_{is} < V_{min}$ or $V_{max} < V_{is}$, it is judged that the drift is deviated from the normal range, and then the process operation is advanced to a fail safe operation process defined by steps after a step 3a.

First, at a step S3a, the pulse width modulation signal PWM, the right direction signal $D_R$, and the left direction signal $D_L$, which are supplied to the motor drive circuit 22 are set to low levels, so that the signals to the H bridge circuit 22b is interrupted. Subsequently, the process operation is advanced to a step S3b which the clutch control signal $S_C$ is set to allow level and the resultant clutch control signal is outputted, so that the electromagnetic clutch apparatus 11 is brought into the non-connect condition.

Then, the process operation is advanced to a step S3c at which the relay control signal $S_R$ is set to a low level and the low-leveled relay control signal $S_R$ is outputted, so that the fail safe relay 23a is opened to interrupt the power supply path from the battery 16 to the H bridge circuit 22b. Next, at a step S3d, an abnormality detection flag is set to "1", and this abnormality notification is made to the high order program such as the main process program, and then the process operation is ended. Thereafter, the motor drive control process operation is not executed in the high order program.

Figure 9:
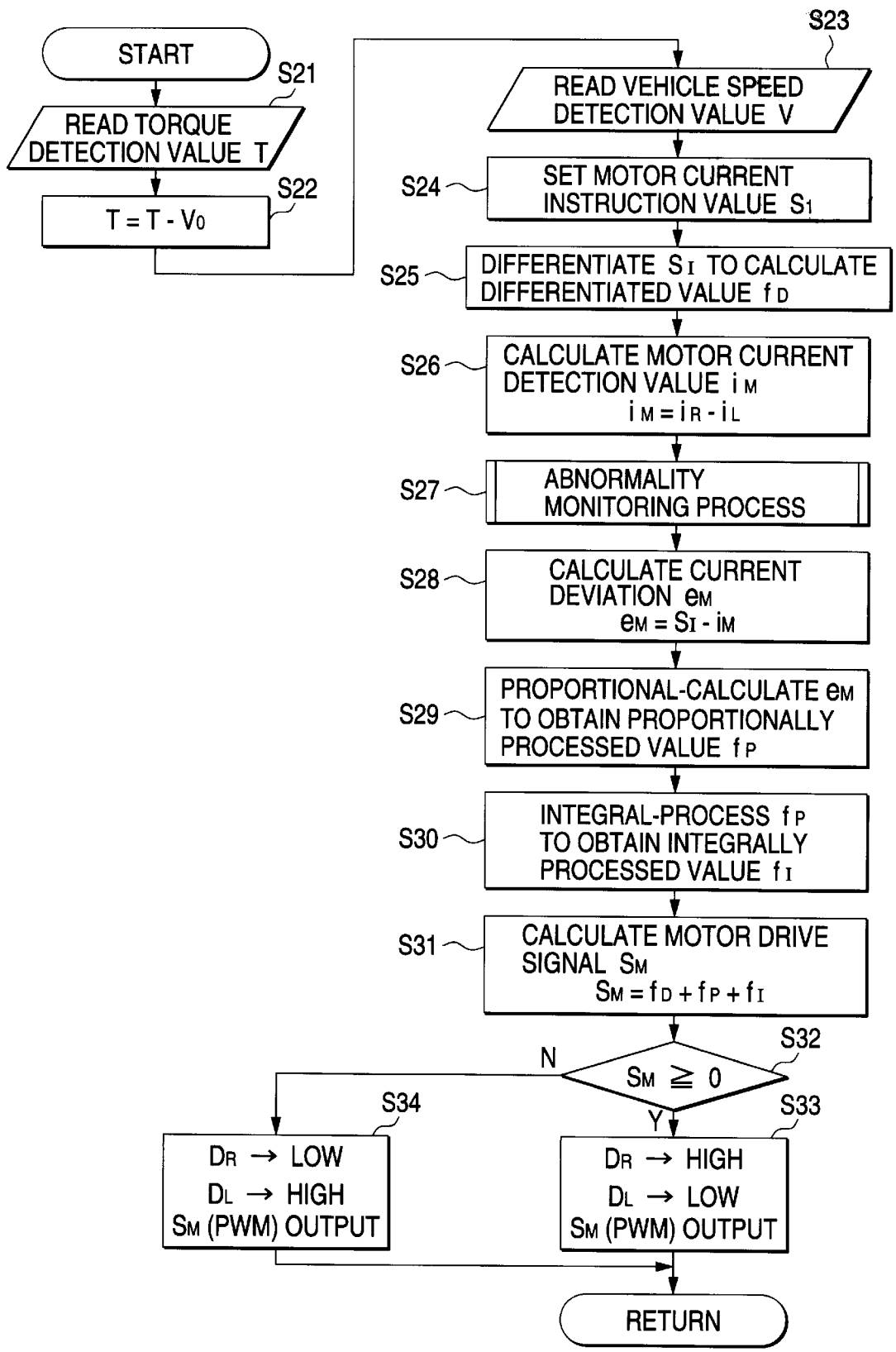
FIG. 9 is a flow chart for representing a control process sequence executed by a central processing unit during normal operation of the electric power steering apparatus, according to the first embodiment.

Next, when the above-described drift detection process operation is carried out and then the drift is located within the normal range, a process sequence of a motor drive control process executed by the central processing unit will now be explained based on a flow chart shown in FIG. 9.

Also, this process operation is carried out by timer-interrupting, for example, a predetermined main program every preselected time, e.g., executed every several msec.

At a first step S21, the torque voltage value T which has been phase-compensated by the phase compensator 18 and is derived from the torque sensor 3 is read via the A/D converter 20a.

Subsequently, the process operation is advanced to a step S22 at which a calculation is made of $T=T-V_o$, and an offset process is performed in such a manner that the torque detection value during the neutral position becomes zero.

Figure 10:
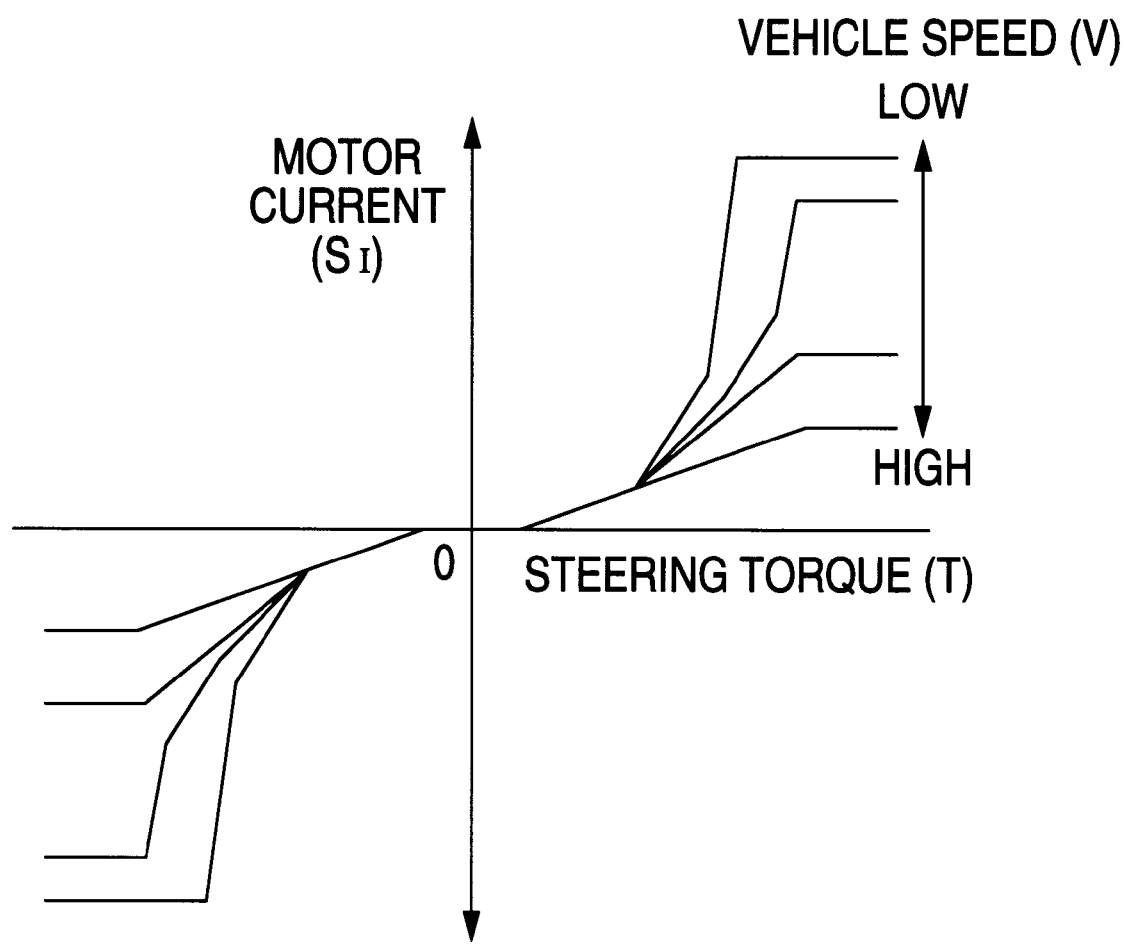
FIG. 10 is a characteristic diagram for showing a motor current instruction value with respect to steering torque while a vehicle speed is used as a parameter.

Next, the process operation is advanced to a step S23 at which the count value of the counter 19, namely the vehicle speed detection value V is read, a reset signal is outputted to the counter 19 so as to reset the counter value. Subsequently, the process operation is advanced to step S24. At this step S24, referring to a characteristic diagram indicative of a correspondence relationship between steering torque, vehicle speeds, and motor currents, as shown in FIG. 10, for example, a retrieval is made of such a motor current corresponding to the torque detection value T and the vehicle speed detection value V, and thereafter this motor current is set as a motor current instruction value $S_1$.

This characteristic diagram indicates a table for representing a relationship among the motor current, the steering torque, and the vehicle speed. This motor current is required to drive the electric motor 12 which may produce the steering assist force corresponding to the steering torque inputted into the steering shaft 2. The lower the vehicle speed is decreased, the larger the motor current instruction value is increased. Also, the larger the steering torque is increased, the larger the motor current instruction value is increased, and when this motor current instruction value exceeds a certain value, this instruction value is not increased from the certain value.

Then, the process operation is advanced to step S25, at which the motor current instruction value $S_1$ is differentially processed to obtain a differentially processed value "$f_D$". At the next step S26, both of a motor current detection value $i_R$ for the right direction and another motor current detection value $i_L$ for the left direction are read. The motor current detection value $i_R$ for the right direction is set as a positive value, whereas the motor current detection value $i_L$ for the left direction is set as a negative value. These motor current detection signals are summed with each other to calculate a motor current detection value "$i_M$". In other words, it is calculated by $i_M = i_R - i_L$.

It should be understood that the current detection circuit 25 performs a sufficient filtering process to the respective signals in order to obtain effective values about the motor current detection values $i_R$ and $i_L$ for the right/left directions.

Figure 11:
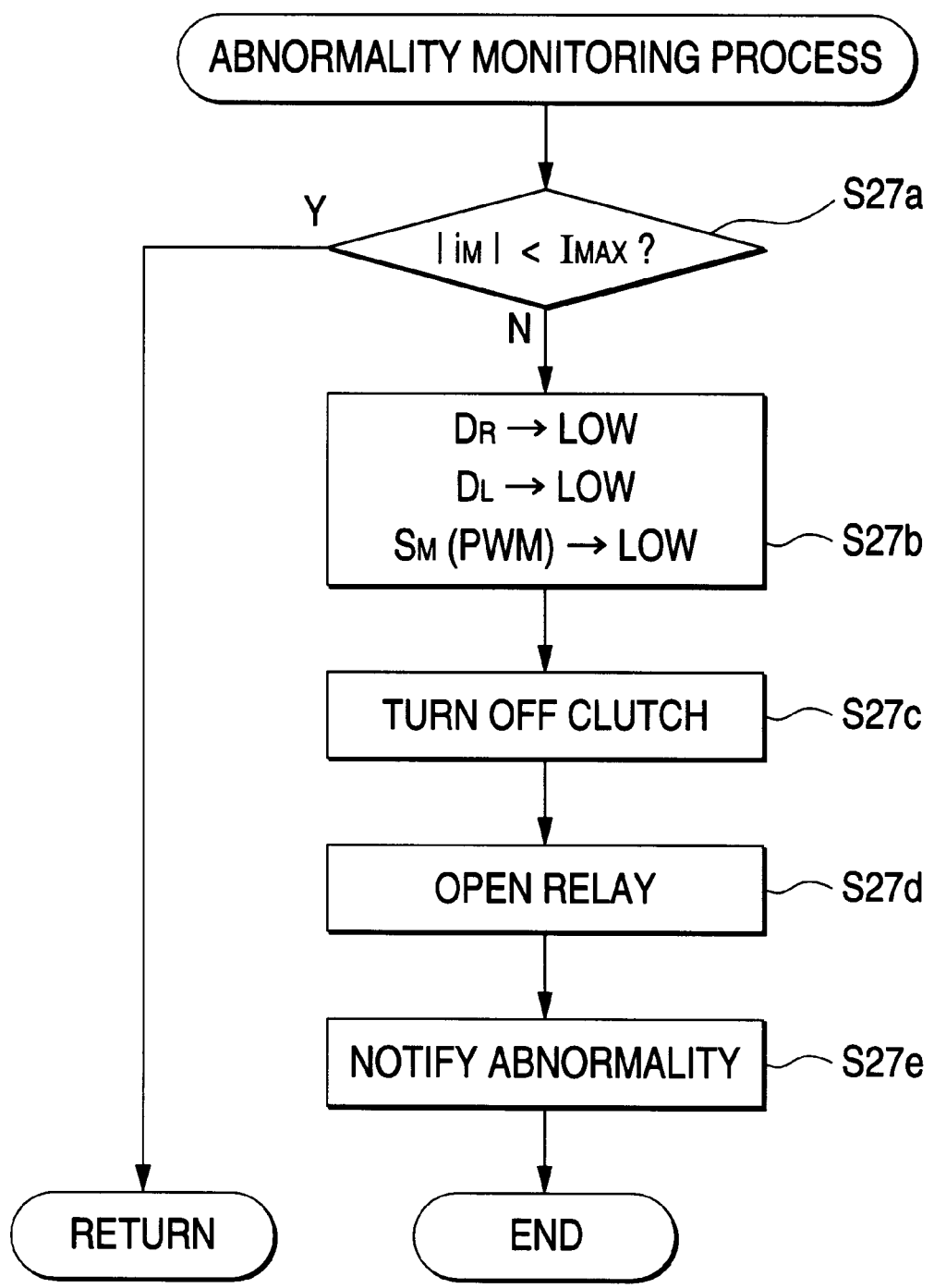
FIG. 11 is a flow chart for indicating the abnormality monitoring process sequence of a motor drive current according to the first embodiment.

Subsequently, the process operation is advanced to step S27, at which such a abnormality monitoring process as shown in a flow chart of FIG. 11 is performed.

In this abnormality monitoring process, at first step S27a, a judgement is made as to whether or not an absolute value $|i_M|$ of the motor current detection value $i_M$ is smaller than a preset maximum current value $I_{MAX}$, by which it is recognizable that the motor drive circuit 22 is operated under normal condition. When the absolute value $|i_M|$ is smaller than the maximum current value $I_{MAX}$, it is judged that the motor drive current is present within the normal range, and thus the process operation is returned to the motor drive control process program.

On the other hand, as a judgement result of the step S27a, when $|i_M| \geq I_{MAX}$, an excessive current flows through the H bridge circuit 22b. Thus, it is judged that a abnormality happens to occur, and then the process operation is advanced to a step S27b. At this step S27b, the levels of the respective instruction signals $S_M$, $D_R$, $D_L$ supplied to the gate drive circuit 22a are set to "LOW", so that the supply of the power to the H bridge circuit is interrupted. Subsequently, the process operation is advanced to step S27c at which the output of the clutch control signal $S_C$ to the clutch drive circuit 24 is stopped, so that the electromagnetic clutch apparatus 11 is operated so as to bring the output shaft of the electric motor 12 and the reduction gears 10 into the disconnect condition.

Then, the process operation is advanced to step S27d at which the relay control signal to the relay drive circuit 23b is set to "LOW", and thus the fail safe relay 22a is opened, so that the supply of power from the battery 16 to the H bridge circuit 22b is interrupted. Next, at step S27e, for instance, the abnormality is notified to the upper grade program such as the main process program, and the process operation is completed. Subsequently, the motor drive control process is no longer executed in the high order program.

As a result of the abnormality monitoring process defined at the step S27, when no abnormality is detected from the motor drive current, the process operation is advanced to step S28.

At the step S28, current deviation "$e_M$" is calculated based on a difference between the motor current instruction value $S_1$ set at the step S24 and the motor current detection value $i_M$ calculated at the step S26, namely $e_M = S_1 - i_M$.

Next, at step S29, the current deviation $e_M$ is multiplied by a predetermined proportional gain to obtain a proportionally processed value "$f_P$". Further, at step S30, this proportionally processed value "$f_P$" is integrated to obtain an integrally processed value $f_1$. Both of the proportionally processed value $f_P$ and the integrally processed value $f_1$ are stored into a predetermined storage region of the memory 21c.

Then, at step S31, the differentially processed value $f_D$, the proportionally processed value $f_P$, and the integrally processed value $f_1$ are added to each other, and the added value is recognized as the motor drive signal $S_M$, and then the process operation is advanced to step S32.

At this step S32, a check is done as to whether or not the motor drive signal $S_M$ is $S_M \geq 0$. In the case of $S_M \geq 0$, it is recognized that the steering wheel 1 is steered along the right steering direction, and thus, the process operation is advanced to step S33. At this step S33, the right direction signal $D_R$ for setting the rotation direction of the electric motor 12 to the normal rotation direction is set to "HIGH", and the left direction signal $D_L$ is set to "LOW". The motor drive signal $S_M$ is outputted to the output interface 21d, and then the voltage of the motor drive signal $S_M$ is converted into the pulse width modulation signal PWM having a predetermined pulse width based on a sawtooth wave produced within the output interface 21d. This pulse width modulation signal PWM is supplied via the gate drive circuit 22a to the H bridge circuit 22b. Then, the motor drive control process program is ended and the process operation is returned to the main program.

On the other hand, when it is not equal to $S_M \geq 0$ at the step S32, it is judged that the steering wheel 1 is steered along the left steering direction, and the process operation is advanced to step S34. At this step S34, the left direction signal $D_C$ used to set the rotation direction of the electric motor 12 along the reverse rotation direction is set to "HIGH", and the right direction signal $D_R$ is set to "LOW" which is outputted. Also, the motor drive signal $S_M$ is converted into the pulse width modulation signal PWM which will then be supplied to the H bridge circuit 22b via the gate drive circuit 22a. Then, the motor drive control process program is accomplished and the process operation is returned to the main program.

Next, operations of the above-described first embodiment will now be explained. In this first embodiment, the drift occurred in the torque sensor is detected every time before the normal torque drive control process is executed. When the drift detection voltage $V_{is}$ is equal to $V_{min} \leq V_{is} \leq V_{max}$, it is so judged that this drift detection voltage $V_{is}$ is present within the normal range, and no such a drift capable of self-steering the steering wheel is produced. Then, the process operation is advanced to the normal torque drive control process.

On the other hand, when either $0 \leq V_{is} < V_{min}$, or $V_{max} < V_{is}$, it is so judged that the drift is deviated from the normal range, and thus all of the control signals supplied to the H bridge circuit 22b are set to low levels. Furthermore, such a fail safe process is carried out that the electromagnetic clutch apparatus 11 is brought into the non-connect state, the fail safe relay 23a is opened, and the operation of the electric motor is stopped. As a consequence, the self steer of the steering wheel is prevented to maintain the safety operation.

When no steering torque is applied and the sliding contractor 3d is located at the neutral position, the torque detection value T supplied to the controller 13 becomes the same voltage value as the voltage when the sliding contractor 3d is located at the neutral position by the effects of the torque detection value setting resistors 13e and 13f. As a consequence, at this time, even when the resistance values of the connector contact resistances R5 and R6 of the respective input/output terminals 3b and 13b for the torque signals are increased and a drift happens to occur, since the torque voltage Vt is kept at the constant value, the self steer of the steering wheel can be avoided.

It should be noted that although the current supplied via the potentiometer is entered into the fixed resistor as the current detection resistor so as to detect the current in the above-explained first embodiment, the present invention is not limited thereto. Alternatively, an operational amplifier may be employed instead of the fixed resistor, and a change in the currents may be converted into a voltage to detect the drift. Also, the drift is detected at the terminals of the current detection resistor 13g. Alternatively, even when the drift is detected at the current output terminal 13a of the current detection resistor 13d connected to the power supply, the drift may be detected by monitoring the current.

In the above-explained first embodiment, although the torque detection value setting resistors 13e and 13f have the same resistance values, the present invention is not limited thereto. For instance, the torque detection value setting registers 13e and 13f having different resistance values from each other may be arranged in such a manner that this output voltage has the same voltage as the torque detection voltage applied to the phase compensating circuit in response to the output voltage of the potentiometer when the steering torque becomes zero. This may be similarly applied to the torque detection value setting resistors $13e_1$, $13f_1$, $13e_2$, and $13f_2$.

Although the microcomputer is employed to judge whether or not the drift amount is present within a preselected range in the above-explained embodiment, such a comparator as a window comparator may be employed instead of this microcomputer to compare/detect the drift amount.

Also, in accordance with the first embodiment, the current supplied via the potentiometer is once converted into a voltage to compare the detected voltage value with the set voltage value, thereby detection the drift. Alternatively, the supplied current may be compared with the preselected constant current by employing a window comparator to thereby the drift.

The process operation to correct the torque detection signal is carried out by the central processing unit in order to cancel the detected drift amount, and then the electric motor may be driven/controlled by outputting the corrected motor drive current signal value from the controller 13.

Next, a description will be made of a second embodiment in such a case that an abnormality contained in a torque detection value of a torque sensor is detected with reference to FIG. 12 to FIG. 16.

The second embodiment owns a similar arrangement to that of the first embodiment except that a torque sensor 3 is arranged by a main potentiometer $3_M$ as a main torque sensor and a sub-potentiometer $3_S$ as a sub-torque sensor. Torque detection values T and T' are outputted from both of the potentiometers $3_M$ and $3_S$, and are supplied to the controller 13, and also a abnormality of the torque detection value T is detected by the controller 12 based upon the drift detection process shown in FIG. 8, the motor drive control process indicated in FIG. 9, and the torque detection values T and T'. The same reference numerals shown in FIG. 5 will be employed as those for denoting the corresponding portions, and detailed descriptions thereof are omitted.

In other words, in the torque sensor 3, the resistance member of the main potentiometer $3_M$ is connected parallel to the resistance member of the sub-potentiometer $3_S$ to constitute a parallel circuit, one end of the connected end portions is connected to a current input terminal 3a, and the other end is connected to a drift output terminal 3c. Each of the potentiometers $3_M$ and $3_S$ has a resistance value $R_P$ across both end portions of the resistance member, and a variable resistance value may be derived from each of sliding contactors 3d and 3d' which slide on the respective resistance members, from which the torque detection values T and T' are outputted. Then, the respective torque detection values T and T' is supplied to the respective torque signal output terminals 3b and 3b'.

Figure 13:
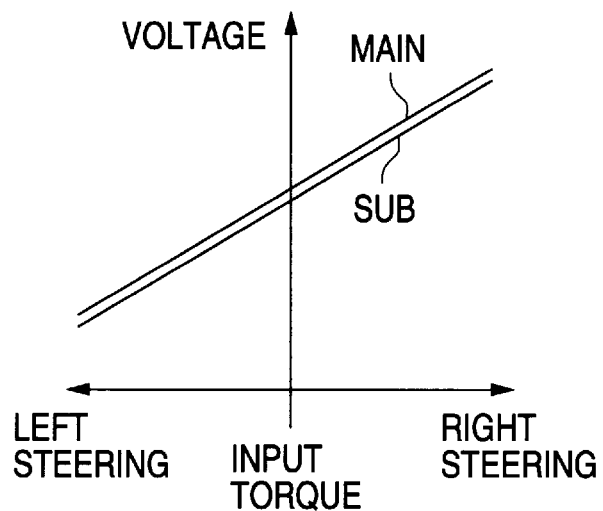
FIG. 13 is a characteristic diagram for denoting an input/output characteristic of a potentiometer according to the second embodiment.

In the torque sensor 3 according to this second embodiment, the normal motor drive control is carried out based upon the torque output value T outputted from the main potentiometer $3_M$, and a abnormality is detected in response to the torque detection values T and T' outputted from the main potentiometer $3_M$ and the sub-potentiometer $3_S$. An input/output characteristic of this torque sensor 3 is represented in FIG. 13. Both of torque detection voltages $V_1$ and $V_{1'}$ functioning as the torque detection values T and T' of the main potentiometer $3_M$ and the sub-potentiometer $3_S$ are varied in a linear form with respect to input torque, and become substantially a half of the power supply voltage E when the input torque becomes zero, newly, under neutral condition. While the right steering torque is increased, the voltage value is increased, whereas while the left steering torque is increased, the voltage value is decreased. It should be understood that although FIG. 13 indicates that the torque detection value $V_1$ of the main potentiometer $3_M$ has a larger value than the torque detection value $V_{1'}$ of the sub-potentiometer $3_S$ with respect to arbitrary input torque, there are some possibilities that the torque detection voltage $V_{1'}$ of the sub-potentiometer $3_S$ becomes a large value due to fluctuations of parts and assembly.

The respective terminals 3a, 3b, 3b', 3c of the torque sensor 3 are connected to a cable 26 having connectors at both ends thereof, and are connected via this cable 26 to the corresponding input terminals, i.e., a current output terminal 13a, a torque signal input terminal 13b, a torque signal input terminal 13b', and a drift input terminal 13c.

A power supply voltage E is applied from a stabilized power supply circuit VR via a current detecting resistor 13d having a resistance value $R_{is}$ to the current output terminal 13a of the controller 13. Then, the torque signal input terminal 13b is connected to a junction point between the torque detection value setting resistors 13e and 13f series-connected to each other. Similarly, the torque signal input terminal 13b' is connected to a joint point between the torque detection value setting resistors 13e' and 13f' series-connected to each other. Each of these joint points is connected to input units of phase compensating circuit 18 and 18' for compensating a phase of an input signal to improve stability of the electric power steering apparatus. The torque detection value setting resistors 13e, 13e' and 13f, 13f' each own a resistance value Rtm. The current supplied from the stabilizing power supply circuit VR will flow through the torque detection value setting resistors 13e, 13e' and 13f, 13f' to the ground potential. Then, the drift input terminal 13c is grounded via a current detecting resistor 13g having the resistance value $R_{is}$, and is connected to an A/D converter 20b. A drift detection voltage $V_{is}$ appearing at this current detecting resistor 13g is applied to the A/D converter 20b.

In this case, an input impedances of the phase compensating circuits 18, 18' and the A/D converter 20b are set so as to have a sufficiently large value, as compared with the resistance values $R_P$ of the potentiometers $3_M$, $3_S$, the resistance value Rtm of the respective torque detection value setting resistors 13e, 13e' and 13f, 13f', and also the resistance value $R_{is}$ is of the current detecting resistor 13g. As a consequence, the influence given by the input impedances of the phase compensating circuit 18, 18' and the A/D converter 20b can be substantially neglected.

In the microcomputer 21, the central processing unit 21b executes the above-explained drift detection process and motor drive control process, and also executes the process for detecting the abnormality of 1the torque detection value as the abnormality detecting means, and furthermore, the set value for comparing/detecting the change amounts of the torque detection values T and T', and the process sequence for performing the control after detecting the change amount are stored in the memory 21. Also, a process sequence for driving/controlling the electric motor 12 is stored into the memory 21.

Figure 14:
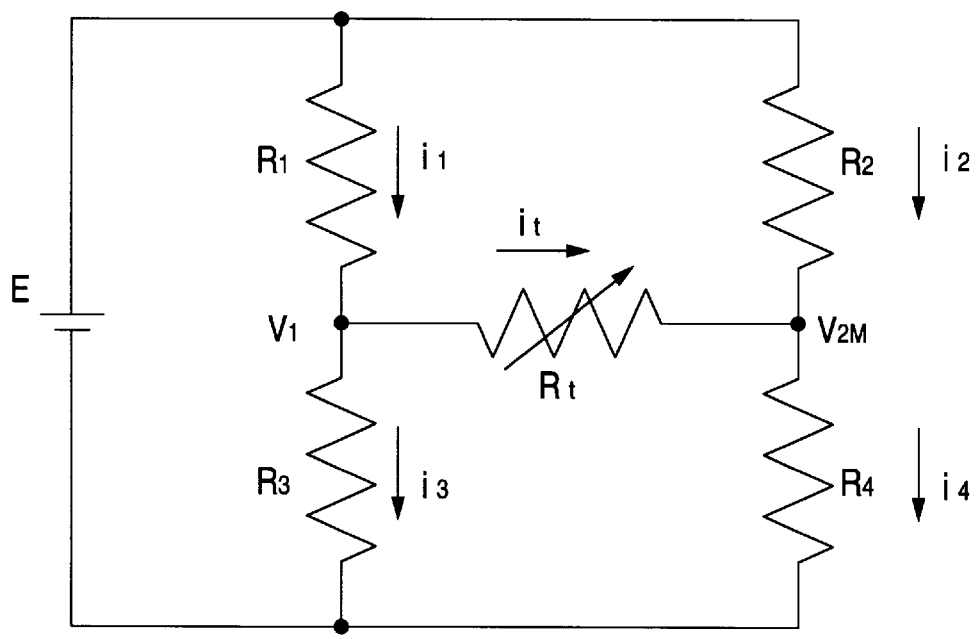
FIG. 14 is an equivalent circuit diagram containing a contact resistance $R_f$.

As to the torque sensor 3 and the controller 13 constructed of the above-explained structures, among the connector contact resistance values R5, R5' and R6, R6' produced in the torque signal output terminals 3b, 3b' of the torque sensor 3 and the torque signal input terminals 13b, 13b' of the controller 13, a value obtained by adding the connector contact resistance values R5 and R6 are used as a contact resistor Rt of a signal line, and an equivalent circuit as to, for example, the main potentiometer $3_M$ is arranged as shown in FIG. 14. In this FIG. 14, a resistor $R_1$ indicates a resistance component between the sliding contactor 3d of the main potentiometer $3_M$ and the output of the stabilized power supply circuit VR, a resistor $R_2$ shows the resistance value Rtm of the torque detection setting resistor 13e, a resistor $R_3$ represents a resistance component between the sliding contactor 3d of the main potentiometer $3_M$ and the ground potential, and a resistor $R_4$ shows the resistance value Rtm of the torque detection value setting resistor 13f.

In this equivalent circuit, a torque detection voltage $V_{2M}$ entered into the phase compensating circuit 18 is expressed by the below-mentioned formula (8):

$$V_{2M}=[R_4/(R_2Rt+R_4Rt+R_4R_2)][Rt+R_2R_3/(R_1+R_3)]E \qquad (8)$$

In this second embodiment, since the resistance values of the torque detection value setting resistors 13e and 13f are set to the same values, if $R_2=R_4$ in the formula (8), then this formula (8) may be expressed by the following formula (9):

$$V_{2M}=[1/(2Rt+R_2)][Rt+R_2R_3/(R_1+R_3)]E \qquad (9)$$

At this time, the torque detection voltage $V_1$ is varied in a linear form with respect to the input torque as represented in a characteristic diagram of FIG. 13. When the input torque becomes zero, i.e., at the neutral position, the voltage value appearing on the sliding contactor 3d of the main potentiometer $3_M$ is selected to be equal to ½ voltage value between the power supply and the ground. Accordingly, giving an attention to $R_3/(R_1+R_3)$ indicative of a ratio of the torque detection voltage $V_1$, assuming now that $R_3/(R_1+R_3)=\alpha$, the characteristic diagram of FIG. 13 may be expressed by the following formula (10):

$$(\alpha-\tfrac{1}{2})K\cdot T \qquad (10)$$

where symbol "k" denotes a predetermined constant containing the spring constant of the torsion bar, and symbol "T" shows steering torque.

When this formula (10) is substituted for the above-explained formula (9), the following formula (11) is obtained:

$$V_{2M}=[R_2KE/(2Rt+R_2)]T+E/2 \qquad (11)$$

In accordance with this formula (11), when the input steering torque T is zero, the torque detection voltage $V_{2M}$ becomes E/2 irrelevant to the resistance value of the contact resistor Rt produced on the signal line.

Figure 15:
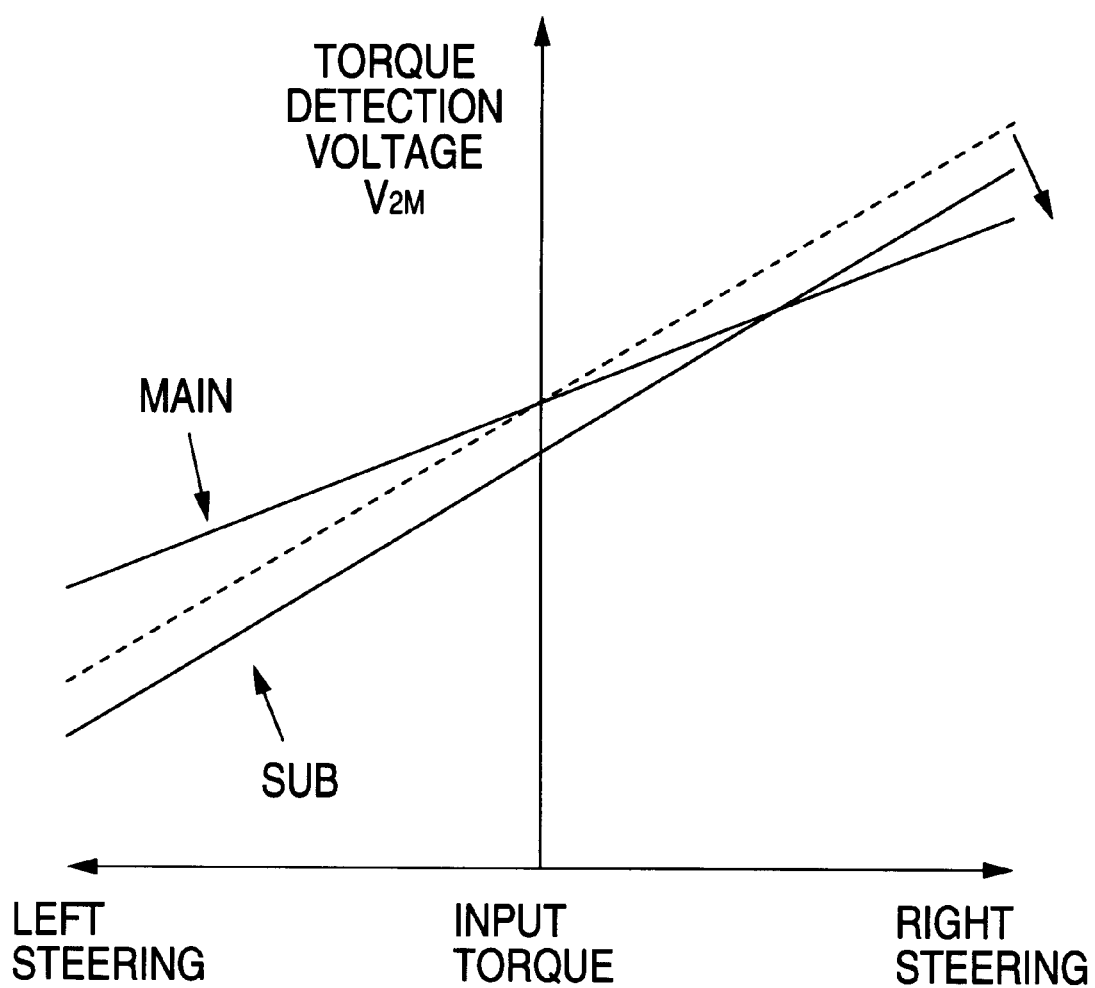
FIG. 15 is a characteristic diagram for indicating a change in a torque detection voltage when the contact resistance is increased.

Then, when the contact resistor $R_t$ is increased, there is a trend that a ratio of the torque detection voltage $V_{2M}$ to the steering torque T is decreased. This is indicated in FIG. 15. A broken line shown in FIG. 15 denotes a characteristic of the main potentiometer $3_M$ when the contact resistor $R_t$ is an initial value. When the contact resistor $R_t$ is increased, the ratio of the torque detection voltage $V_{2M}$ to the steering torque T, namely the inclined amount is decreased along the arrow direction. In this second embodiment, based upon the inclined amounts of the main potentiometer $3_M$ and the sub-potentiometer $3_S$, namely the change amounts of the torque detection voltages $V_{2M}$ and $V_{2S}$ with respect to the input steering torque, the abnormality of the torque detection value caused by the increase of the contact resistor $R_t$ is detected.

Figure 16:
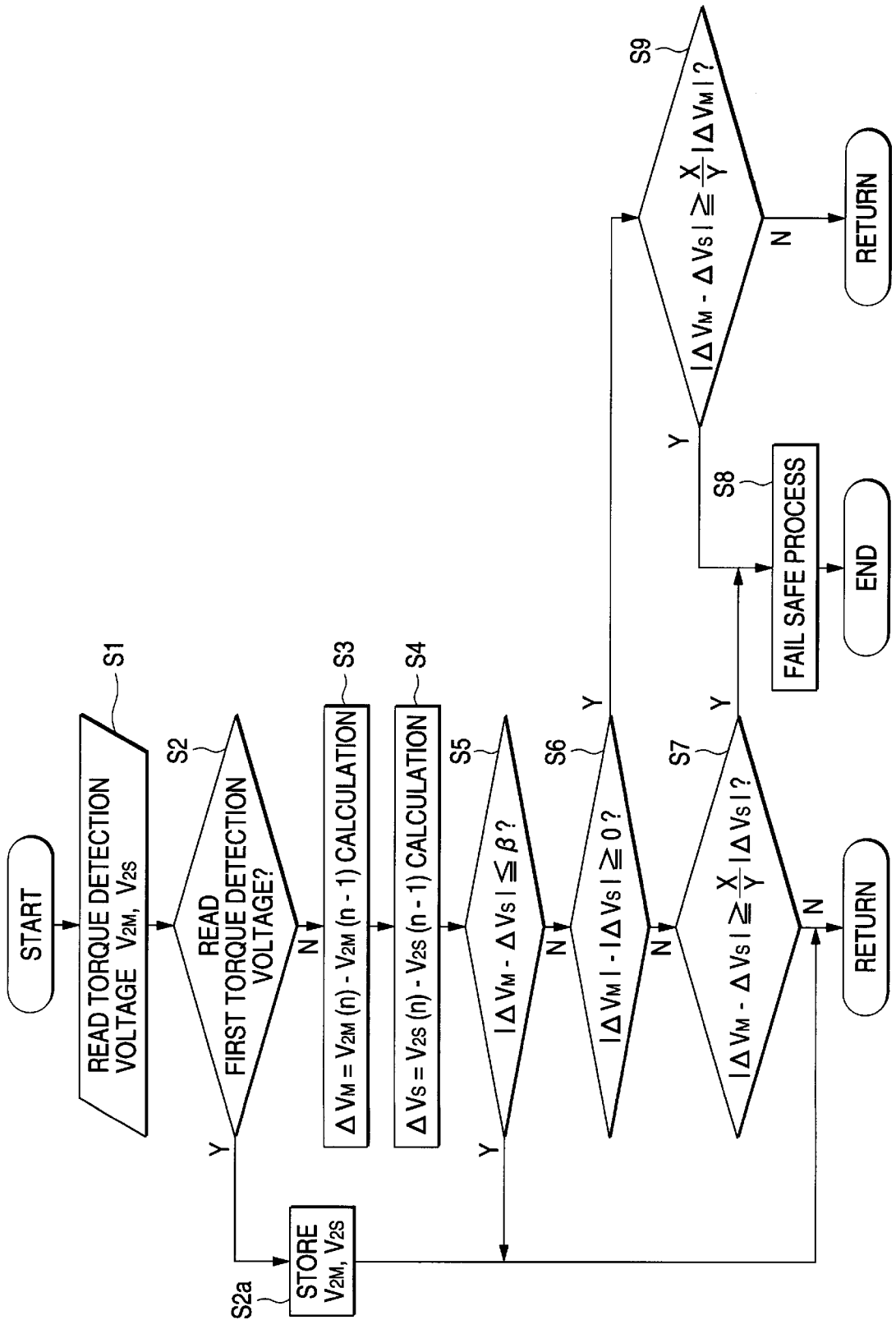
FIG. 16 is a flow chart for indicating the abnormality detecting process of the torque detection value.

Then, the process sequence to detect the abnormality of the torque detection value as the means for detecting the abnormality executed in the central processing unit will now be described with reference to a flow chart of FIG. 16.

This process operation is executed by interrupting, for example, a predetermined main program every preselected time, e.g., several milliseconds.

At first step S1, torque detection voltages $V_{2M}$ and $V_{2S}$ are read via the A/D converters 20a and 20a'. Then, the process operation is advanced to step S2, a check is done as to whether or not the reading operation of the torque detection voltages $V_{2M}$ and $V_{2S}$ corresponds to a first reading operation. In this embodiment, although the torque detection voltages $V_{2M}$ and $V_{2S}$ are read every time the timer interrupt is carried out, the difference value is calculated between the previously read values and the presently read values in order to detect the abnormality of the torque detection value. Thus, no calculation is carried out when the first reading operation is performed. Accordingly, during the first reading operation, the process operation is advanced to step S2a at which the read torque detection voltages $V_{2M}$ and $V_{2S}$ are stored into a predetermined storage region. Then, the process operation is returned to the high order program such as the main process program. After the second reading operation, the process operation is advanced to the next step S3.

At this step S3, the torque detection voltage $V_{2M}(n-1)$ stored during the previous timer interrupt is subtracted from the presently read torque detection voltage $V_{2M}(n)$ to thereby calculate a main-sided torque voltage change amount $\Delta V_M$ indicative of a change amount of a torque detection voltage value every preselected time (sampling time) in the main potentiometer $3_M$. This calculation formula is indicated by the following formula (12):

$$\Delta V_M=V_{2M}(n)-V_{2M}(n-1) \qquad (12),$$

where symbol "n" denotes an arbitrary sampling time, and symbol "n−1" represents a sampling time succeeding to a sampling time "n" by 1.

Then, when the calculation is accomplished, the presently read torque detection voltage $V_{2M}$ is newly stored into a predetermined storage region where the previously read torque detection voltage $V_{2M}$ has been stored, and the torque detection voltage $V_{2M}$ is updated.

In the case that the steering torque is zero, the main-sided torque voltage change amount $\Delta V_M$ is equal to 0, since there is no change amount in the torque detection voltage $V_{2M}$. At this time, the torque detection value inputted into the microcomputer 21 is kept at the neutral voltage because of the effects by the torque detection value setting resistors 13e, 13f and 13e', 13f'. As a result, when the steering torque is zero, even if the contact resistor $R_t$ is increased, it can be avoided that the steering shaft is self-steered. On the other hand, when the steering torque is slightly varied, it is possible to obtain the main-sided torque voltage change amount $\Delta V_M$ in correspondence with the change amount of the torque detection voltage value, so that the main-sided torque voltage change amount $\Delta V_M$ corresponding to the increase of the contact resistor $R_t$ can be detected. This may be similarly applied to the subsequent sub-sided torque voltage change amount $\Delta V_S$.

Next, the process operation is advanced to a step S4 at which the torque detection voltage $V_{2S}(n-1)$ stored during the preceding time interrupt is subtracted from the presently read torque detection voltage $V_{2S}(n)$ in a similar manner to that of the step S3. Thus, a calculation is made of a sub-sided torque voltage change amount $\Delta V_S$ indicative of a torque detection voltage change amount in the sub-potentiometer $3_S$ every preselected time. This calculation formula is given by the below-mentioned equation (13):

$$\Delta V_S=V_{2S}(n)-V_{2S}(n-1) \qquad (13)$$

Then, when the calculation is ended, the present torque detection voltage $V_{2S}$ is newly stored into a predetermined storage region where the previous torque detection voltage $V_{2S}$ has been stored, and the torque detection voltage $V_{2S}$ is updated.

Subsequently, the process operation is advanced to a step S5 at which the value of the sub-sided torque voltage change amount $\Delta V_S$ is subtracted from the value of the main-sided torque voltage change amount $\Delta V_M$ and an absolute value of this subtracted value is calculated. Then, a judgement is made as to whether or not this absolute value is smaller than, or equal to a preset value "β" so as to judge whether or not a difference in the respective torque detection voltages $V_{2M}$ and $V_{2S}$ is located within a range of the preset value "β". This judgement formula is given by (14):

$$|\Delta V_M - \Delta V_S| \leq \beta \tag{14}$$

When any one of the contact resistors $R_t$ of the main potentiometer $3_M$ and the sub-potentiometer $3_S$ is increased, since the values of the change amount $\Delta V_M$ and $\Delta V_S$ of the potentiometer $3_M$ or $3_S$, whose contact resistor is decreased, a value of $|\Delta V_M - \Delta V_S|$ is increased. As a consequence, the value of $|\Delta V_M - \Delta V_S|$ is compared with the predetermined value β, so that an increase in the contact resistor $R_t$ can be detected. When there is no increase in the contact resistor $R_t$, the value of $|\Delta V_M - \Delta V_S|$ becomes zero in principle. However, because of fluctuations in the resistance values of the torque detection value setting resistors 13e, 13f and 13e', 13f' used to maintain it at the neutral voltage, and also differences in the resistance values of the initial contact resistors $R_t$ occurred in the signal lines for the respective potentiometers $3_M$ and $3_S$, there is a small difference in the change amounts of the respective detection voltages $V_{2M}$, $V_{2S}$. When the contact resistors $R_t$ of both potentiometers $3_M$ and $3_S$ are simultaneously increased at the same level, the value of $|\Delta V_M - \Delta V_S|$ becomes zero. However, generally speaking, since there is substantially no probability that such a condition occurs, there is substantially no change amount in case of $|\Delta V_M - \Delta V_S| \leq \beta$. In other words, it is recognizable that the value of the contact resistor $R_t$ is present in a no problem range, and the process operation is returned to the high order main program. On the other hand, in case of $|\Delta V_M - \Delta V_S| > \beta$, the process operation is moved to a step S6 in order to further judge as to whether or not it is under abnormality state.

At step S6, a comparison is made by checking whether or not such a value obtained by subtracting the absolute value of the sub-sided torque voltage change amount $\Delta V_S$ from the absolute value of the main-sided torque voltage change amount $\Delta V_M$ is greater than zero. Then, it is so judged whether the main potentiometer, or the sub-potentiometer is under normal state. This judgement formula is defined by the following formula (15):

$$|\Delta V_M| - |\Delta V_S| \geq 0 \tag{15}$$

As shown in FIG. 15, in conjunction with the increase of the contact resistor $R_t$, the change amounts of the torque detection voltages $V_{2M}$ and $V_{2S}$ are decreased. As a result, for instance, assuming that the contact resistor $R_t$ of the main potentiometer $3_M$ is increased and there is no change in the contact resistor $R_t$ of the sub-potentiometer $3_S$, since the change amount $\Delta V_M$ of the main-sided torque voltage is decreased, there is such a trend that the value of $|\Delta V_M| - |\Delta V_S|$ becomes a negative value. As described above, when $|\Delta V_M| - |\Delta V_S| < 0$, it may be judged that the sub-potentiometer $3_S$ is under normal state, as compared with the main potentiometer $3_M$. The process operation is advanced to a step S7 in order to perform the subsequent process while using the sub-potentiometer $3_S$ as the reference. Conversely, when $|\Delta V_M| - |\Delta V_S| \leq 0$, it may be judged that the main potentiometer $3_M$ is under normal state, as compared with the sub-potentiometer $3_S$. The process operation is advanced to execute the subsequent process while using the main potentiometer $3_M$ as the reference.

At the step S7, a judgement is made as to whether or not it satisfies $|\Delta V_M - \Delta V_S| \geq (X/Y)|\Delta V_S|$, and another judgement is done as to whether or not there is a abnormality in the torque detection value of the main potentiometer, while using the sub-potentiometer $3_S$ as the reference. This judgement formula is calculated as follows. First, an inclined amount $\Delta G_M$ of the torque detection value $V_{2M}$ with respect to the steering torque of the main potentiometer $3_M$ is calculated based on the below-mentioned formula (16):

$$\Delta G_M = \Delta V_M / [T(n) - T(n-1)] \tag{16}$$

where symbol "T(n)−T(n−1)" indicates a change amount of steering torque every preselected sampling time (timer interrupt time), and symbol "T" denotes input steering torque.

Similarly, an inclined amount $\Delta G_S$ of the torque detection voltage $V_{2S}$ of the sub-potentiometer $3_S$ is calculated by the following formula (17):

$$\Delta G_S = \Delta V_S / [T(n) - T(n-1)] \tag{17}$$

In the case that there is a abnormality in the torque detection value due to an increase in the contact resistor $R_t$, the respective inclined amounts $\Delta G_M$ and $\Delta G_S$ are decreased. In this process operation at the step S7, since it is assumed that the sub-potentiometer $3_S$ is under normal state, a difference between the inclined amount $\Delta G_M$ and the inclined amount $\Delta G_S$ is calculated while using the inclined amount $\Delta G_S$ as the reference. When this difference value exceeds a preselected value X, it may be judged that the abnormalitys contained in the torque detection value of the main potentiometer $_M$. This judgement formula is indicated by the following formula (18):

$$|\Delta G_M - \Delta G_S| > X \tag{18}$$

This predetermined value X is set to such a value slightly larger than the above-explained preset value β. An insensitive range is formed between the predetermined value β and a preselected value X, so that a judgement about the normal/abnormal states can be performed under stable condition.

When the formulae (16) and (17) are substituted for the formula (18), the below-mentioned formula (19) is given:

$$|[\Delta V_M - \Delta V_S]/[T(n) - T(n-1)]| > X \tag{19}$$

Since the sub-potentiometer $_S$ is under normal state, assuming now that the value of the contact resistor R1 is substantially equal to zero, the inclined amount $\Delta G_S$ is expressed by "KE" based upon the formula (11), and this incline amount is set as "Y", for the sake of convenience. Also, since it is difficult to directly calculate the value of T(n)−T(n−1), the following calculation is carried out so as to cancel it.

In the formula (19), assuming now that $\Delta G_S = KE = Y$ in the above-explained formula (17), when the term of T(n)−T(n−1) is canceled, the below-mentioned judgement formula (20) may be calculated:

$$|\Delta V_M - \Delta V_S| \geq (X/Y)|\Delta V_S| \tag{20}$$

Since the inclined amount $\Delta G_M$ of the main potentiometer $3_M$ is detected while using the sub-potentiometer $_S$ under normal state in this judgement formula, when it becomes $|\Delta V_M - \Delta V_S| < (X/Y)|\Delta V_S|$, it can be judged that the torque detection value of the main potentiometer $_M$ is under normal condition. At this time, the process operation is returned to the high order main program. On the other hand, when it becomes $|\Delta V_M - \Delta V_S| \geq (X/Y)|\Delta V_S|$, it can be judged that a abnormality happens to occur in the torque detection value of the main potentiometer $3_M$. At this time, the process operation is advanced to a fail safe process defined at a step S8.

At the step S8, for instance, the below-mentioned process operation is carried out as the fail safe process. First, the pulse width modulation signal PWM, the right direction signal $D_R$, and the left direction signal $D_L$, which are supplied to the motor drive circuit 22, are set to low levels, so that the supply of signals to the H bridge circuit 22b is stopped. Subsequently, the clutch control signal $S_a$ is outputted as a low-level, so that the electromagnetic clutch apparatus 11 is brought into the non-connect condition. Then, the relay control signal $S_R$ is outputted as a low level, so that the fail safe relay 23a is opened to stop the supply of the power supply voltage to the H bridge circuit from the battery 16. Next, for example, the abnormality (abnormal) detection flag is set to "1", so that this occurrence of the abnormality is notified to the high order program, and the process operation is ended. Subsequently, no interrupt process operation for detecting the abnormality of the torque detection value is performed in the high order program.

Then, at a step S9, a judgement is made as to whether or not it becomes $|\Delta V_M - \Delta V_S| \geq X/Y|\Delta V_M|$. Another judgement is done as to whether or not there is a abnormality in the torque detection value of the sub-potentiometer $_S$, while using the main potentiometer $_M$ as the reference. This judgement formula may be obtained by executing a calculation sequence similar to that of the step S7. When it becomes $|\Delta V_M - \Delta V_S| < (X/Y)|\Delta V_M|$, it can be judged that the torque detection value of the sub-potentiometer $3_S$ is normal. In this case, the process operation is returned to the high order main program.

On the other hand, when it becomes $|\Delta V_M - \Delta V_S| \geq (X/Y)|\Delta V_M|$, it can be judged that a abnormality happens to occur in the torque detection value of the sub-potentiometer $_S$. At this time, the process operation is advanced to the above-explained fail safe process defined at the step S8.

Next, operations of the above-explained second embodiment will now be described.

In accordance with the second embodiment, the abnormality detections of the torque detection value for the respective potentiometers $3_M$ and $3_S$ is executed before every time the normal motor drive control process operation is carried out. First of all, the respective change amounts $\Delta V_M$ and $\Delta V_S$ of the respective torque detection voltages $V_{2M}$ and $V_{2S}$ are calculated with respect to each of the interrupt times. At the step S5, a judgement is made as to whether or not the value of $|\Delta V_M - \Delta V_S|$ is smaller than, or equal to the preselected value $\beta$, so that the abnormality judgement of the contact resistor $R_t$ is simply carried out. In the case of $|\Delta V_M - \Delta V_S| \leq \beta$, it may be judged that the contact resistor $R_t$ is located within the normal range, the normal motor drive control of the electric power steering apparatus is executed.

On the other hand, when it becomes $|\Delta V_M - \Delta V_S| > \beta$, the abnormality detecting process operation is further continued to thereby detect on which side of the main potentiometer $_M$ and the sub-potentiometer $_S$, the contact resistor $R_t$ is increased. If it is so judged that the sub-potentiometer $_S$ is under normal condition, another judgement is made at the step S7 as to whether or not the change amount $\Delta V_M$ of the torque detection voltage $V_{2M}$ of the main potentiometer $3_M$, namely the decrease amount is present within a preselected range, while using the change amount $\Delta V_S$ of the torque detection voltage $V_{2S}$ of the sub-potentiometer $_S$ as a reference.

Then, when such a judgement is made that the main potentiometer $3_M$ is under normal condition, a check is done a to whether or not the change amount $\Delta V_S$ of the torque detection voltage $V_{2S}$ of the sub-potentiometer $_S$ is located within a preselected range. In accordance with this embodiment, although the judgement is made as to whether or not the change amounts $\Delta V_M$ and $\Delta V_S$ are present within the normal range also at the step S5, since the judgements are carried out at the steps S7 and S9, while using the potentiometers $3_M$ and $3_S$ having lower values of the contact resistors $R_t$ as a reference, more precise abnormality judgement can be performed.

As a judgement result of the steps S7 and S8, when the increase of the contact resistor $R_t$ is located within the normal range, the normal motor drive control of the electric power steering apparatus is performed, whereas when the increase of the contact resistor $R_t$ exceeds the normal range, a preselected fail safe process operation is carried out to maintain the safety operation.

As previously explained, since the abnormality caused by the increase of the contact resistor $R_t$ is detected based upon the main-sided torque voltage change amount $\Delta V_M$ and the sub-sided torque change amount $\Delta V_S$ in accordance with the second embodiment, it is possible to detect the relative change in the torque detection voltages $V_{2M}$ and $V_{2S}$ irrelevant to the magnitudes of the applied steering torque. As a consequence, even when the very low steering force is produced as in the position near the neutral position where there is no large change in the steering torque, it is possible to detect the abnormality of the torque detection value as same as when the steering torque is largely changed. It is easily possible to detect the abnormalitys contained in the torque detection voltages $V_{2M}$ and $V_{2S}$, which are caused by the aging effects of the contact resistance values of the sliding contactors and also of the signal lines for the main potentiometer $_M$ and the sub-potentiometer $3_S$.

Also, since the abnormality of the contact resistor $R_t$ is relatively detected based upon the main-sided torque voltage change amount $\Delta V_M$ and the sub-sided torque voltage change amount $\Delta V_S$, the setting values used as the reference to detect the abnormality can be determined without considering the contact resistance values occurred while the connector units of the cable 26 for connecting the torque sensor 3 with the controller 13 are manufactured/assembled. As a consequence, there is no need to make up a larger set value, and it is possible to improve the detecting precision. Even when the contact resistance values are increased due to the aging effect, the abnormality of the torque detection value can be firmly detected.

Figure 17:
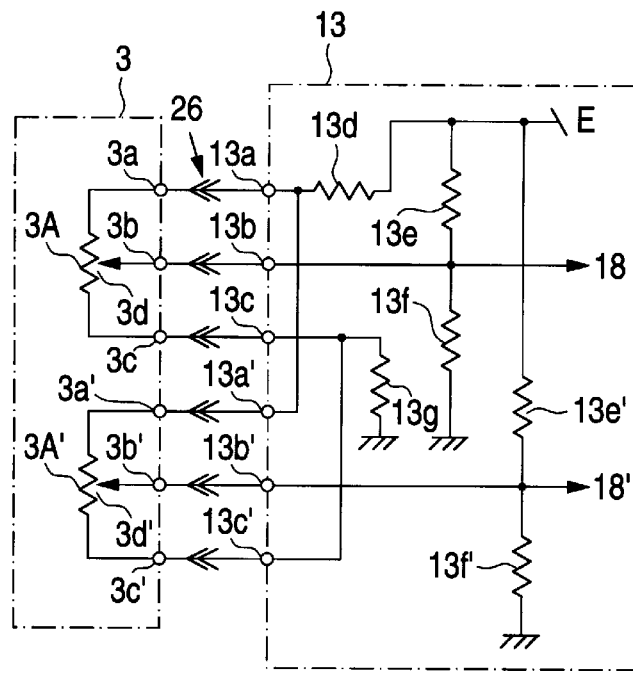
FIG. 17 is a block diagram for indicating such a case that the present invention is applied so as to detect an abnormal torque detection value, according to a third embodiment.

Referring now to FIG. 17, a circuit arrangement of a third embodiment according to the present invention will be explained.

Figure 12:
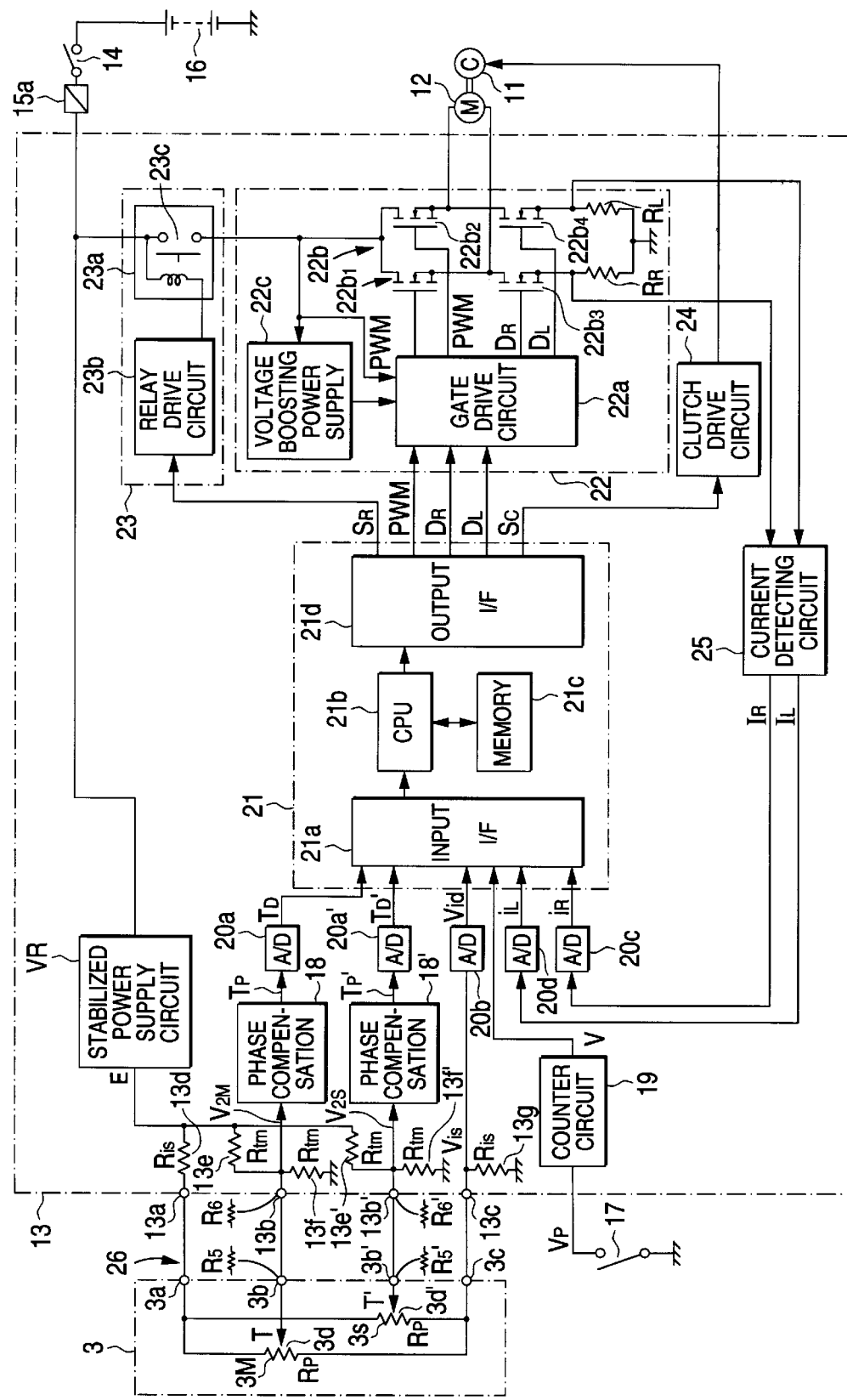
FIG. 12 is a block diagram for showing such a case that the present invention is applied so as to detect an abnormal torque detection value, according to a second embodiment.

This third embodiment has a similar arrangement as the torque sensor of FIG. 12 except that in the above-described second embodiment, the respective ends of the main potentiometer $_M$ and the sub-potentiometer $_S$ of the torque sensor 3 are constructed of the respective individual terminals, and are connected via the cable 26 to the controller 13. As a consequence, the respective end portions of both edges of the main potentiometer $_M$ are connected to a current input terminal 3a and a drift output terminal 3c, respectively, and are connected via the cable 26 to current detecting resistors 13d, 13g, respectively, and further are connected to the power supply and the ground potential. Then, the respective end portions of both edges of the sub-potentiometer $3_S$ are connected to a current input terminal 3a' and a drift output terminal 3c', respectively, and are connected via the cable 26 to current detecting resistors 13d, 13g respectively. It should be noted that sliding contactors 3d and 3d' are connected in a similar manner to that of the first embodiment, and torque detection voltages $V_{2M}$ and $V_{2S}$ derived from the sliding contactors 3d and 3d' are supplied to phase compensating circuits 18 and 18'.

Figure 18:
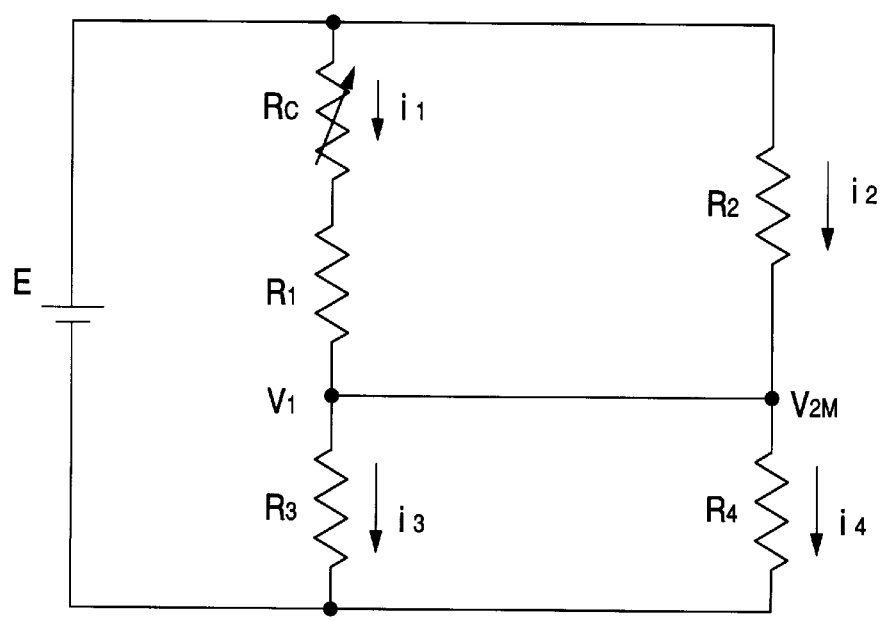
FIG. 18 is an equivalent circuit diagram containing a contact resistance $R_c$.

In accordance with this third embodiment, when there is such a not negligible contact restor $R_c$ between the current input terminals 3a, 3a' and the power supply, an equivalent circuit, for example, as to the main potentiometer $_M$ may be expressed as in FIG. 18. The torque detection voltage $V_{2M}$ in this equivalent circuit is expressed by the following formula (21):

$$V_{2M}=[R_3/(R_1+R_3+R_c)]E \qquad (21)$$

Then, in this formula (219, similar to the above-explained second embodiment, it is assumed that $R_3/(R_1+R_3)=\alpha$, the torque detection voltage $V_{2M}$ may be represented by the following formula (22):

$$V_{2M}=[\alpha/(1+\alpha R_c/R_3)]E \qquad (22)$$

Further, in this formula (22), similar to the second embodiment, it is assumed that $\alpha=K\cdot T+\frac{1}{2}$, the torque detection voltage $V_{2M}$ may be expressed by the following formulae (23) and (24):

$$V_{2M}=(KE/\gamma)T+E/2\gamma \qquad (23)$$

note that, $$\gamma=1+(KT+\frac{1}{2})(R_c/R_3) \qquad (24).$$

Therefore, when the contact resistor $R_c$ is varied, since the value of the torque detection voltage $V_{2M}$ is changed in response to the input steering torque T, the abnormality of the torque detection value caused by the increase in the contact resistor $R_c$ can be detected by detecting the change amount in the torque detection voltage $V_{2M}$ every preselected time. It should be understood that similar to the above case, the abnormality of the torque detection voltage caused by the increase in the contact resistance value can be detected as to a contact resistor existing between the drift output terminals $3_c$, $3_{c'}$ and the ground potential.

As described above, in accordance with the third embodiment, there is the effects achieved in the second embodiment, and furthermore, the increase in the contact resistance value produced in the power supply line can be detected. As a consequence, it is possible to detect the changes in all of the contact resistance values existing between the torque sensor 3 and the controller 13, and also possible to detect the abnormalitys of the torque detection values caused by the above-described reasons. Therefore, a further improvement of safety control operation may be achieved.

On the other hand, the drift detection process operation is carried out in accordance with the same manner as the first embodiment. A process operation similar to that of the flow charts shown in FIG. 7, FIG. 8, and FIG. 10 is executed. The self steer of the steering wheel can be prevented by checking as to whether or not the drift voltage $V_{is}$ appearing at the current detecting resistor 13g is present within the normal range. When this drift voltage $V_{is}$ is present within the normal range, the normal motor drive control is performed. It should also be noted that the resistance value of the current detecting resistor is made smaller than the resistance value of the embodiment with the basic structure in order that both of the minimum value $V_{min}$ and the maximum value $V_{max}$ in the drift detecting process can be employed as the same values.

Then, when no steering torque is applied, the torque is applied, the torque detection values $T_1$ and $T_2$ become the same voltage values as the voltages of the sliding contacts $3d_1$, and $3d_2$ at the neutral positions clue to the effects of the torque detection value setting resistors $13e_1$, $13f_1$ and $13e_2$, $13f_2$. As a result, at this time, even when the resistance values of the respective connector contact resistors at the input/output terminals of the torque signal are increased to produce the drift, the torque voltage $V_t$ is maintained at constant value, so that the self steer of the steering wheel can be prevented.

Although the above-explained second and third embodiments have described the torque sensor 3 in which the main potentiometer $_M$ and the sub-potentiometer $_S$ have been assembled in one body, the present invention is not limited thereto. Alternatively, the respective potentiometers may be separately employed and may be located at different positions.

In the above-explained second and third embodiments, the torque detection voltage is detected from the torque sensor equipped with the potentiometer, but the present invention is not limited thereto. Alternatively, two sets of main torque sensor and sub-torque sensor constructed of a bridge arrangement partially having a coil may be prepared to detect torque detection voltages therefrom. A difference value is calculated from a change amount of each torque detection voltage every preselected time, so that a change in contact resistors produced in the connector unit and the like may be detected.

Also, in the second and third embodiments, the abnormality of the torque detection value caused by the increase in the contact resistance values has been explained. Alternatively, when the respective potentiometers $3_M$ and $3_S$ are disconnected, or shortcircuited, it may appear as the abnormality of the torque detection value. Therefore, it is also possible to detect the abnormality of the torque detection value when the signal line is disconnected and/or shortcircuited in accordance with a flow chart shown in FIG. 16.

In the above-described second and third embodiments, when the formula (20) is modified, it is given as the following formula (25):

$$|\Delta V_M/\Delta V_S| \geq (X/Y)+1 \qquad (25)$$

Assuming now that the right hand of this formula (25) is equal to, for example, a predetermined value "γ", the abnormality of the torque detection value may be detected by comparing the predetermined value "γ" with the value of $|\Delta V_M/\Delta V_S|$.

Although the abnormality judgements have been performed twice at the step S5 and the steps S7, S9 in the above-described second and third embodiments. When no detection is performed which potentiometer $_M$ or $3_S$ is brought into the abnormality state, the process operations defined at the steps S6, S7, S9 may be omitted. In this case, at the step S5, the predetermined value βs set to be such a value slightly larger than this value. When it becomes $|\Delta V_M-\Delta V_S|>\beta$, it may be judged that there is a abnormality in the torque detection value. Then, the process operation is advanced to the step S8 at which the fail safe process is carried out.

Although the torque detection value setting resistors 13e and 13f have the same resistance values in the second and third embodiments, the present invention is not limited thereto. Alternatively, the torque detection value setting resistors 13e and 13f having different resistance values from each other may be arranged in such a manner that the output voltage of the potentiometer becomes equal to the torque detection value supplied to the phase compensating circuit in response to the output voltage of this potentiometer when the steering torque becomes zero. This may be similarly applied to the other torque detection value setting resistors 13e' and 13f'.

Furthermore, in the first to third embodiment, the motor drive signal $S_M$ outputted from the central processing unit is converted into the pulse width modulation signal PWM to thereby drive the electric motor. Alternatively, the motor drive signal $S_M$ is not converted into the pulse width modulation signal PWM, but into an analog voltage signal, and also NPN transistors may be employed instead of the FETs to which the pulse width modulation signals PWM are inputted. A voltage proportional to this analog voltage is applied to a base terminal of each of the NPN transistors in order to drive the electric motor.

Although all of the process operations, i.e, the proportional process, the differential process, and the integral process have been carried out to calculate the motor drive signal value in the above-explained first to third embodiments. Alternatively, any of these process operations may be arbitrarily combined to calculate the motor drive signal value.

Figure 19:
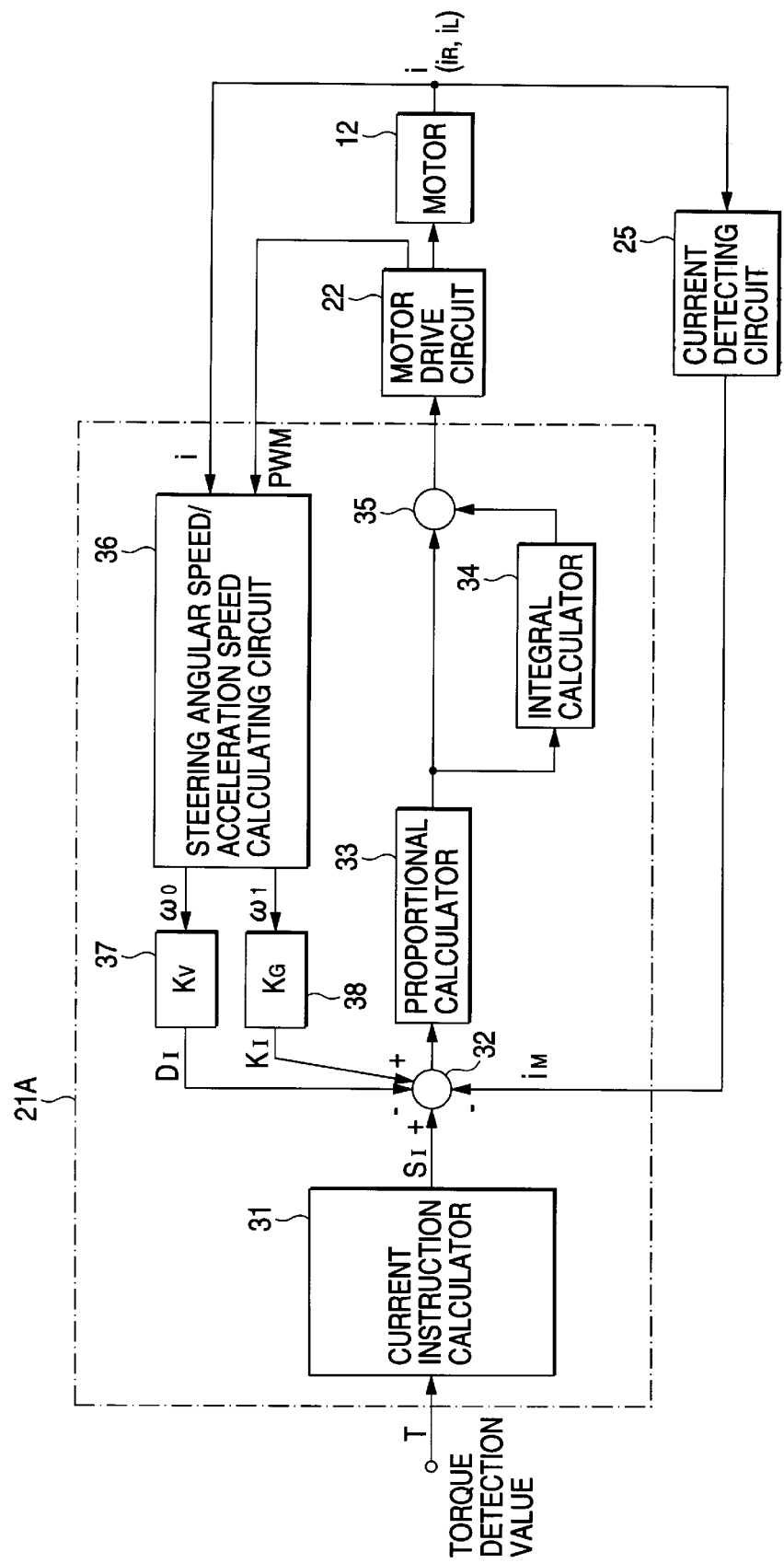
FIG. 19 is a schematic block diagram for showing a control circuit for sensing a steering condition based upon the torque detection value, steering angle speed value, and steering angle acceleration value.
Figure 20:
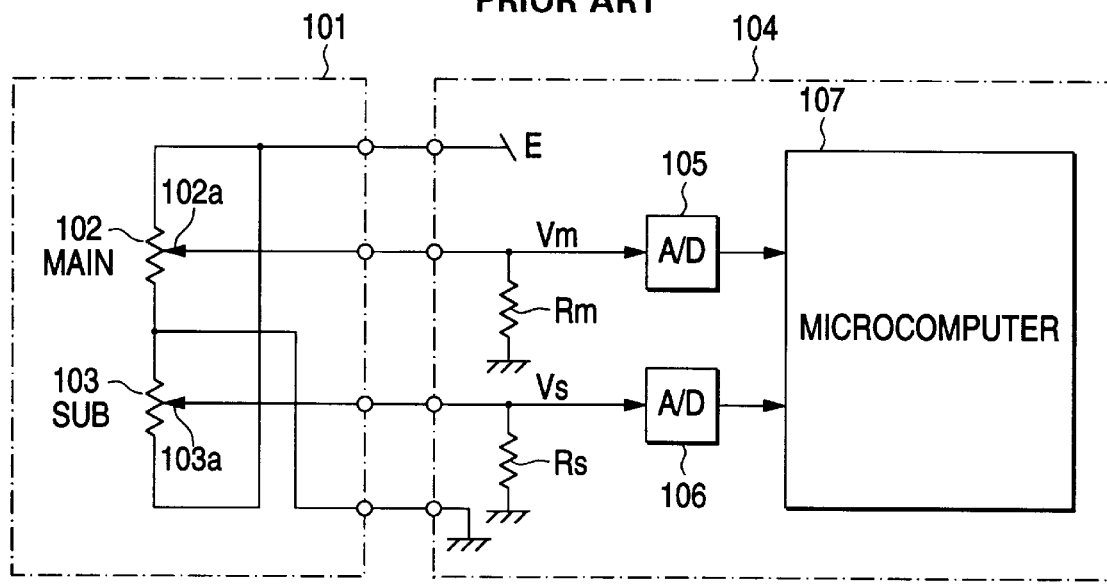
FIG. 20 shows a conventional torque detecting circuit diagram including drift detection.
Figure 21:
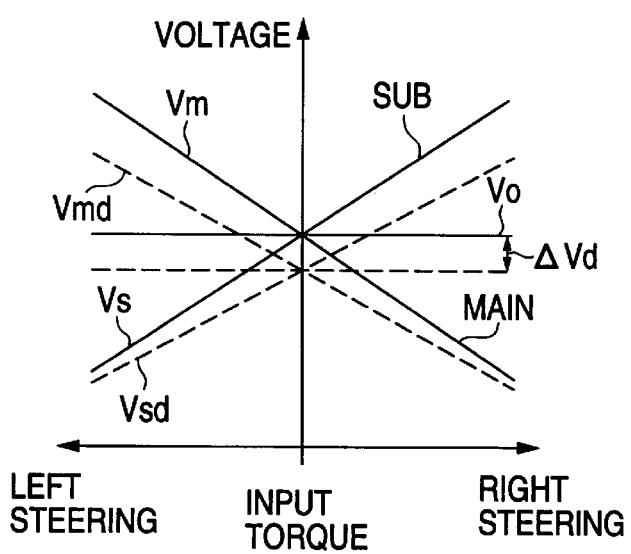
FIG. 21 is a characteristic diagram for indicating the drift characteristic according to the prior art.
Figure 22:
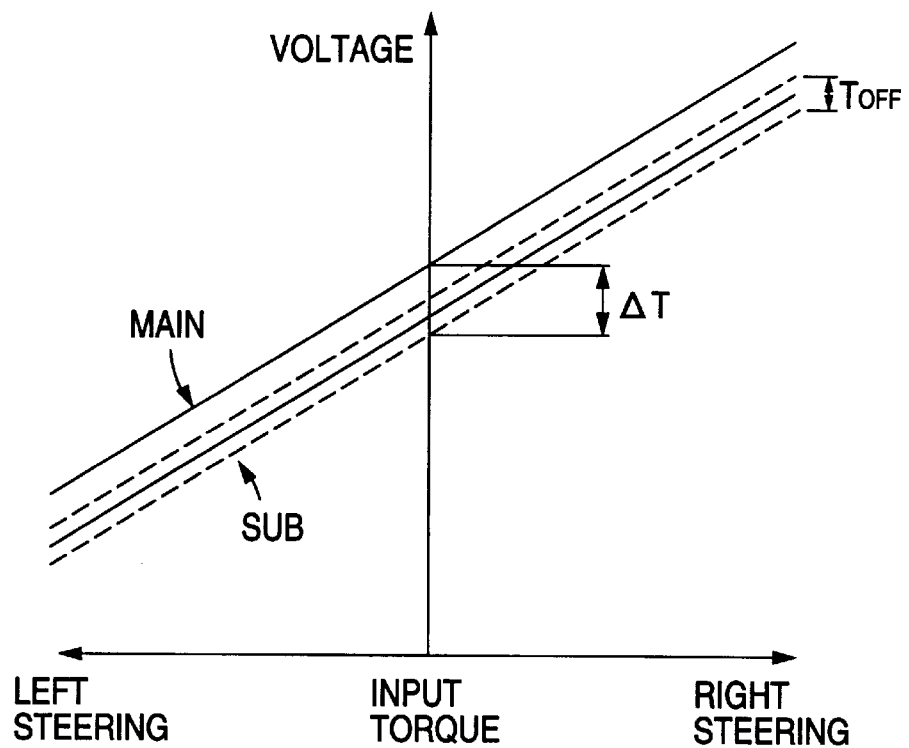
FIG. 22 is an explanatory diagram for explaining conventional torque voltage offset.
Figure 23:
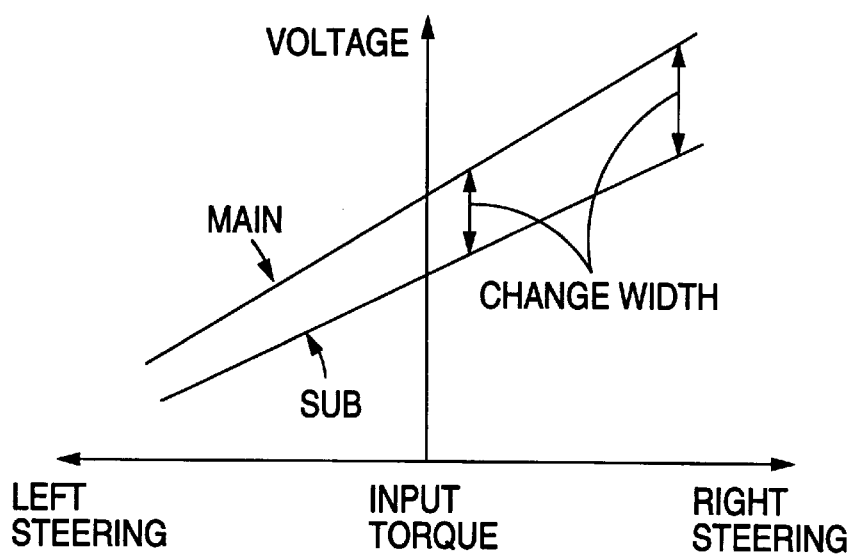
FIG. 23 is an explanatory diagram for representing a change in changing widths of torque voltages.

Furthermore, the above-explained first to third embodiments have explained such a motor drive control that the steering condition is sensed based on only the torque detection value, and the auxiliary steering torque is produced in accordance with this torque detection value. In other case, for example, when a drive lane is changed during highspeed drive, the steering conditions are sensed based upon not only the steering torque, but also the steering angular speed or the steering acceleration speed of the steering wheel. Auxiliary torque in response to these values may be produced to thereby perform the motor drive control. In FIG. 19, there is shown a schematic block diagram of a control circuit for sensing a steering condition based on a torque detection value, a steering angle speed value, and a steering acceleration speed value.

As indicated in this drawing, a control circuit 21A is arranged by a current instruction calculator 31, an adder/subtracter 32, a proportional calculator 33, an integral calculator 34, an adder 35, a steering angular speed/acceleration speed calculating circuit 36, a damper coefficient circuit 37, and an inertia compensating coefficient circuit 38. The torque detection value T is entered into the current instruction calculator 31 of the control circuit 21A so as to be converted into a predetermined motor current instruction value $S_1$. Thereafter, this predetermined motor current instruction value is supplied to the adder/subtracter 32. In addition to the motor current instruction value $S_1$, a current detection signal $i_M$, a damper signal $D_1$, and an inertia signal $K_1$, corresponding to the respective output signals from the current detecting circuit 25, the damper coefficient circuit 37, and the inertia compensating coefficient circuit 38 are supplied to the adder/subtracter 32. With respect to the motor current instruction value $S_1$, the adder/subtracter 32 subtracts the current detection signal $i_M$, subtracts the damper signal $D_1$, and adds the inertia signal $K_1$. In the proportional calculator 33 to which the output signal of the adder/subtracter 32 is supplied, a preselected proportional gain is multiplied. The multiplied value is directly supplied to the adder 35, and is similarly supplied to the adder 35 via the integral calculator 34 for performing a predetermined integral process. Then, a predetermined motor drive signal is outputted from the adder 35 to the motor drive circuit 22. In the motor drive circuit 22, the pulse width modulation signal PWM having a predetermined pulse width is outputted to the steering angular speed/acceleration speed calculating circuit 36, and the motor drive current is supplied to the electric motor 12. Then, a motor drive current value "i" is outputted from the electric motor 12 to the steering angular speed/acceleration speed calculating circuit 36 and the current detecting circuit 25. In the steering angular speed/acceleration speed calculating circuit 36, a steering angular speed "$\omega_o$" calculated based on the entered pulse width modulation signal PWM and the entered motor current "i" is outputted to the damper coefficient circuit 37, and a similarly calculated steering acceleration speed "$\omega_1$" is outputted to the inertia compensating coefficient circuit 38.

The calculations about the steering angular speed $\omega_o$ and the steering acceleration speed $\omega_1$ in the steering angular speed/acceleration speed calculating circuit 36 are performed as follows. First, when a duty ratio D of the pulse width modulation signal PWM and the power supply voltage $V_{BAT}$ are employed, an average voltage V applied to the electric motor 12 may be expressed by the following formula:

$$V = D \cdot V_{BAT} \qquad (26)$$

When the electric motor 12 is rotated, a back electromotive force is produced. Assuming now that a back electromotive force constant is "$K_T$", a back electromotive force voltage produced in the electric motor 12 becomes $K_T \times \omega_o$. Therefore, the average voltage V applied to the electric motor 12 having a coil resistance R may also be expressed by the following formula:

$$V = K_T \cdot \omega_o + R \cdot i \qquad (27)$$

Based upon the formulae (36) and (27), the steering angular speed $\omega_o$ may be obtained as follows:

$$\omega_o = (D \cdot V_{BAT} - R \cdot i)/K_T \qquad (28)$$

The steering acceleration speed $\omega_1$ is calculated by differentiating this formula (28) by time "t".

The calculated steering angular speed $\omega_o$ is multiplied by a preselected damper coefficient $K_V$ in the damper coefficient circuit 37, and this multiplied value is subtracted from the motor current instruction value $S_1$ to perform the damper control, so that electric viscosity resistance is given the steering system so as to improve the safety drive operation of the vehicle. Also, the calculated steering acceleration speed $\omega_1$ is multiplied by a predetermined inertia compensating coefficient $K_G$ in the inertia compensating coefficient circuit 38, and this multiplied value is added to the motor current instruction value $S_1$ so as to execute the inertia compensating control. As a consequence, a delay in the motor response characteristic caused by the motor inertia is compensated. Alternatively, the steering acceleration speed $\omega_1$ may be directly detected by the sensor. Also, for instance, an angle value detected by an angle sensor mounted on the motor shaft may be differentiated by time "t" to firstly calculate the steering angular speed $\omega_o$ and further to differentiate this steering angular speed to obtain the steering acceleration speed $\omega_1$.

Utilization for Industrial Field

As previously described, according to the claim 1 of the present invention, the power supply current is supplied to the torque detecting potentiometer, the current flowing through the potentiometer is inputted into the current detecting means, and the output value of the current detecting means is compared with the preset value by the comparing means to detect a drift produced in the potentiometer. Since the change in the currents is monitored by the current detecting means, the change in the drifts can be directly detected. The present invention has such an advantage that the drift can be firmly detected by the simple circuit arrangement without lowering the detection sensitivity.

Then, according to the claim 2 of the present invention, there is provided the torque detection value setting means for setting the torque detection value to be equal to the output voltage of the potentiometer when no steering torque is applied. As a result, even when the resistance value of the connector contact resistor of the input/output terminal for the torque signal is increased and thus the drift happens to occur, the torque detection voltage is kept constant by effects of the torque detection value setting means when no steering torque is applied. Thus, the self steer of the steering wheel can be prevented to improve the safety drive.

According to the claim 3 of the present invention, since the torque detection valve setting means is arranged by the torque detection value setting resistor connected to the torque signal output terminal of the torque sensor and between both ends of the power supply, the torque detection voltage when no steering torque is applied can be kept constant with a simple arrangement.

Furthermore, according to the claim 4 of the present invention, the abnormality detecting means for detecting the abnormality of the torque detection value is provided in which calculation is made of the difference value between the change amount of the torque detection value per unit hour, outputted from the main torque sensor, and the change amount of the torque detection value per unit hour, outputted from the sub-potentiometer. Accordingly, it is possible to obtain the stable difference value of the torque detection values irrelevant to the magnitudes of the applied steering torque. As a consequence, even when a very small steering force is applied, i.e., a very small torque detection value, the abnormality of the torque detection value can be detected in a similar manner when a large steering force is applied. It is easily possible to detect the abnormality of the torque detection value caused by the aging effects of the contact resistance values occurred in the signal lines of the main torque sensor and the sub-torque sensor.

Moreover, in accordance with the claim 4 of the present invention, when the abnormality of the torque detection value is detected, since the difference value between the torque detection values of the main torque sensor and the torque detection values of the sub-torque sensor is not directly used, such a set value used as a reference to detect the abnormality is no longer defined by considering the contact resistance values produced during the manufacturing/assembling operations as to the contact resistors of the connector unit for electrically connecting the control means with the main torque sensor and the sub-torque sensor. As a result, a need to set a larger set value can be canceled to improve the detection precision. Even when the contact resistance values are increased due to the aging effects, there is such an effect that the abnormality of the torque detection value can be firmly detected.

Moreover, in accordance with the claim 4 of the present invention, the abnormality of the torque detection value is detected based upon the respective change amounts of the torque detection values per unit hour, derived from the main torque sensor and the sub-torque sersor, so that the abnormality of the torque detection value caused by the increases in the contact resistance value can be detected. Additionally, there is another effect that the abnormality of the torque detection value caused by the disconnection and the short-circuit of the respective torque sensors can be simultaneously performed.

According to the invention of this claim 5, the external connection terminal of the torque sensor can be constructed of three components, i.e., one pair of connection terminals and external connection terminal can be made simple, and can be easily connected to the control means.

In accordance with the invention of this claim 6, in addition to the advantage of the claim 4, it is possible to detect the increase in the contact resistance value occurred in the power supply line. The changes in all of the contact resistance values existing in the torque sensor and the control means can be detected, and the abnormalitys of the torque detection values caused by the above contact resistance value changed can be detected.

According to the invention as defined in claim 7, the drifts produced in the potentiometers can be firmly detected. Also, for example, the abnormalitys of the torque detection values such as the failure of the torque sensor can be correctly detected, which are caused by the variation in the torque detection value due to the aging effect of the connector contact resistance value, and by the loose contacts of the sliding contactors of the potentiometers irrelevant to such a very small steering force under which the torque detection value is low, and such a large steering force.

What is claimed is:

1. In a control apparatus of an electric power steering apparatus comprising a torque sensor equipped with a torque detecting potentiometer having a resistance body, both ends of which being connected to a power supply, and a sliding contactor slid on the resistance body for outputting a torque detection value, said torque sensor detecting steering torque of a steering system; an electric motor for producing a steering auxiliary force to the steering system; control means for outputting a control signal used to control the electric motor in response to at least the torque detection value outputted from the torque sensor; and drive means for driving the electric motor in response to the control signal of the control means, the control apparatus comprising:

current detecting means for detecting a power supply current flowing between both ends of the potentiometer; and drift detecting means for comparing an output value of the current detecting means with a preset value to thereby detect a drift occurred in the potentiometer.

2. A control apparatus of an electric power steering apparatus as claimed in claim 1, further comprising torque detection value setting means for setting the torque detection value, supplied when no steering torque is applied, to the same value as a voltage value outputted from the potentiometer to thereby output the set torque detection value to the control means, the torque detection value setting means being arranged between the same power supply and ground as those of the potentiometer.

3. A control apparatus of an electric power steering apparatus as claimed in claim 2 wherein:

said torque sensor is arranged by a current input terminal and a drift output terminal connected to both ends of the power supply; a potentiometer connected between both of the current input terminal and the drift output terminal; and a torque signal output terminal connected to the sliding contactor of said potentiometer, and said torque detection value setting means is constructed of torque detection value setting resistors each connected between said torque signal output terminal and both ends of said power supply.

4. In a control apparatus of an electric power steering apparatus including a torque sensor equipped with a torque detecting potentiometer having a resistance body, both ends of which being connected to a power supply, and a sliding contactor slid on the resistance body for outputting a torque detection value, the torque sensor detecting steering torque of a steering system; an electric motor for producing a steering auxiliary force to the steering system; and control means for controlling the steering auxiliary force produced by the electric motor in response to at least the torque detection value outputted from the torque sensor; wherein:

the torque sensor is constructed of a main potentiometer and a sub-potentiometer;

the control means controls the steering auxiliary force produced by the electric motor based upon at least a torque detection value of the main potentiometer; and the control apparatus further comprises abnormality detecting means for calculating a change amount per unit hour at the same time for each of torque detection values of the main potentiometer and of the sub-potentiometer, and also for calculating a difference value between the calculated change amount of the main potentiometer and the calculated change amount of the sub-potentiometer to thereby detect an abnormality of the torque detection value based on the difference value.

5. A control apparatus of an electric power steering apparatus as claimed in claim 4, wherein the torque sensor includes connection terminals connected to both ends of the power supply; main potentiometer and sub-potentiometer connected in parallel between the connection terminals; and a torque detection value output terminal connected to sliding contactors of both of the main and sub-potentiometers.

6. A control apparatus of an electric power steering apparatus as claimed in claim 4, wherein said torque sensor includes two sets of connection terminals connected in parallel between both ends of the power supply; a main potentiometer connected to one set of the connection terminals; a sub-potentiometer connected to the other set of the connection terminals; and torque detection value output terminals connected to sliding contactors of both of the main and sub-potentiometers.

7. In a control apparatus of an electric power steering apparatus including a torque sensor equipped with a torque detecting potentiometer having a resistance body, both ends of which being connected to a power supply, and a sliding contactor slid on the resistance body for outputting a torque detection value, the torque sensor detecting steering torque of a steering system; an electric motor for producing a steering auxiliary force to the steering system; control means for outputting a control signal used to control the electric motor in response to at least the torque detection value outputted from the torque sensor; and drive means for driving the electric motor in response to the control signal of the control means, wherein:

the torque sensor is constructed of a main potentiometer and a sub-potentiometer;

the control means controls the steering auxiliary force produced by the electric motor based upon at least a torque detection value of the main potentiometer; and the control apparatus further comprises abnormality detecting means for calculating a change amount per unit hour at the same time for each of torque detection values of the main potentiometer and of the sub-potentiometer, and also for calculating a difference value between the calculated change amount of the main potentiometer and the calculated change amount of the sub-potentiometer to thereby detect an abnormality of the torque detection value based on the difference value;

current detecting means for detecting a power supply current flowing between both ends of the potentiometer; and drift detecting means for comparing an output value of the current detecting means with a preset value to thereby detect a drift occurred in the potentiometer.

* * * * *